US010513436B1

(12) United States Patent
Siriwardane et al.

(10) Patent No.: US 10,513,436 B1
(45) Date of Patent: Dec. 24, 2019

(54) PRODUCTION OF PURE HYDROGEN AND SYNTHESIS GAS OR CARBON WITH CUO-FE2O3 OXYGEN CARRIERS USING CHEMICAL LOOPING COMBUSTION AND METHANE DECOMPOSITION/REFORMING

(71) Applicant: United States Department of Energy, Washington, DC (US)

(72) Inventors: Ranjani Siriwardane, Morgantown, WV (US); Hanjing Tian, Morgantown, WV (US)

(73) Assignee: U.S. Department of Energy, Washington, DC (US)

(*) Notice: Subject to any disclaimer, the term of this patent is extended or adjusted under 35 U.S.C. 154(b) by 47 days.

(21) Appl. No.: 15/375,692

(22) Filed: Dec. 12, 2016

Related U.S. Application Data

(60) Provisional application No. 62/265,677, filed on Dec. 10, 2015.

(51) Int. Cl.
*B01J 23/745* (2006.01)
*C01B 3/40* (2006.01)
*C01B 3/24* (2006.01)
*C01B 3/06* (2006.01)

(52) U.S. Cl.
CPC ............... *C01B 3/40* (2013.01); *B01J 23/745* (2013.01); *C01B 3/06* (2013.01); *C01B 3/24* (2013.01); *C01B 2203/02* (2013.01); *C01B 2203/0233* (2013.01); *C01B 2203/0261* (2013.01); *C01B 2203/0277* (2013.01); *C01B 2203/0475* (2013.01); *C01B 2203/0838* (2013.01); *C01B 2203/1047* (2013.01); *C01B 2203/1241* (2013.01)

(58) Field of Classification Search
CPC . B01J 23/85; B01J 23/868; B01J 21/00; B01J 23/745; C01B 2203/1047; C01B 2203/1052; C01B 3/40; C01B 2203/1076; C01B 3/06; C01B 3/24; C01B 2203/0277; C01B 2203/1241; C01B 2203/0261; C01B 2203/0838; C01B 2203/0475; C01B 2203/0233; C01B 2203/02; B01D 53/944
See application file for complete search history.

(56) References Cited

U.S. PATENT DOCUMENTS 3,444,099 A * 5/1969 Sinfelt .................. B01D 53/944
423/213.2

* cited by examiner

*Primary Examiner* — Amber R Orlando
*Assistant Examiner* — Syed T Iqbal
(74) *Attorney, Agent, or Firm* — Timothy L. Harney; Michael J. Dobbs; Brian J. Lally

(57) ABSTRACT

Methods, systems and apparatus relate to producing synthesis gas or carbon and hydrogen utilizing a reduced catalyst $CuO-Fe_2O_3$. The method comprises introducing $CH_4$; reducing the $CuO-Fe_2O_3$ with the introduced $CH_4$, yielding at least a reduced metal catalyst; oxidizing the reduced metal with $O_2$ yielding $CuO-Fe_2O_3$; and generating heat that would be used for the hydrogen and carbon or syngas production with the reduced catalyst $CuO-Fe_2O_3$.

11 Claims, 21 Drawing Sheets

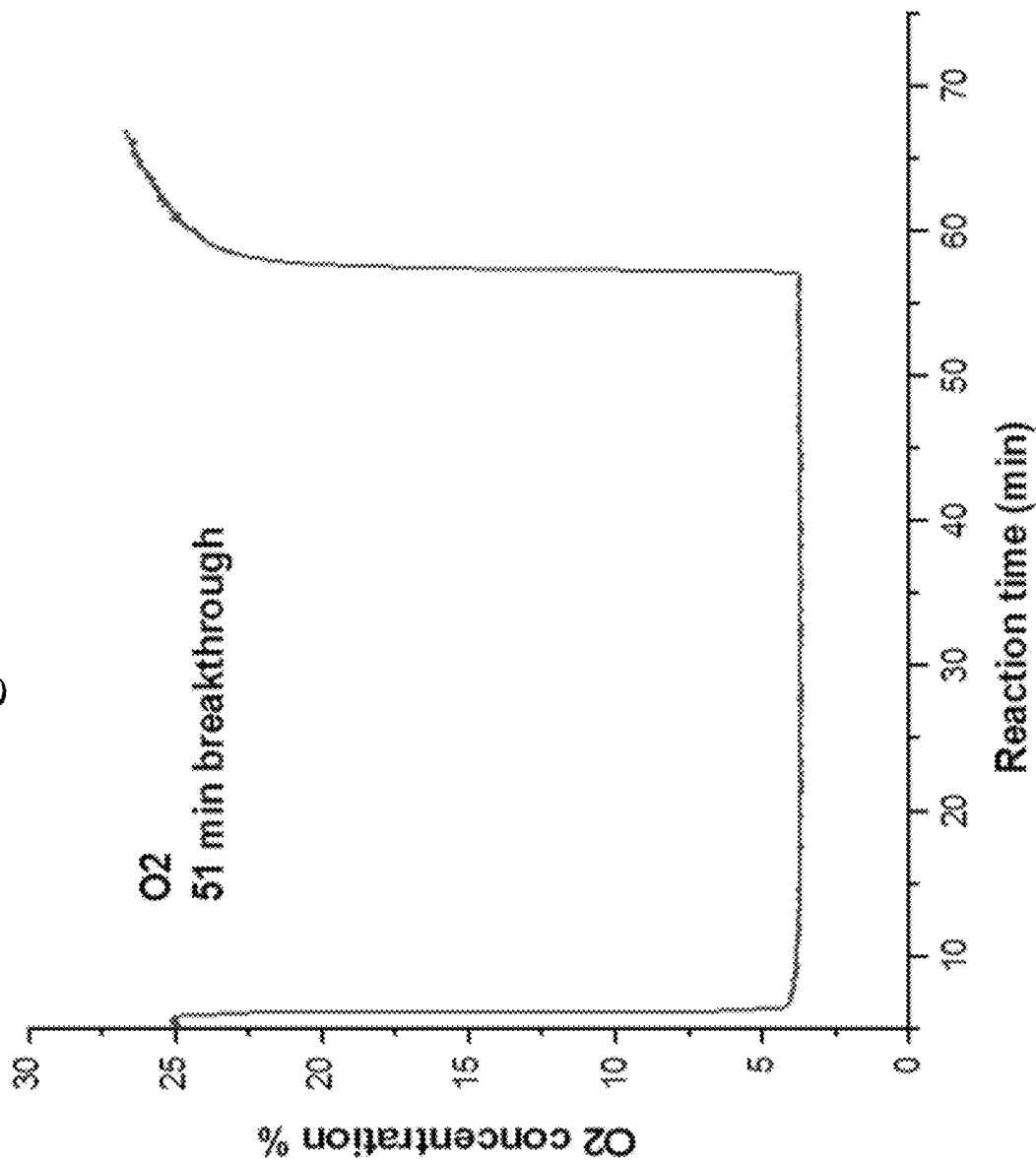

PRODUCTION OF PURE HYDROGEN AND SYNTHESIS GAS OR CARBON WITH CUO-FE2O3 OXYGEN CARRIERS USING CHEMICAL LOOPING COMBUSTION AND METHANE DECOMPOSITION/REFORMING

CROSS-REFERENCE TO RELATED APPLICATIONS

This non-provisional patent application is related to and claims priority from U.S. Provisional Patent Application No. 62/265,677 filed Dec. 10, 2015, the complete subject matter of which is incorporated herein by reference.

STATEMENT OF GOVERNMENT SUPPORT

The United States Government has rights in this invention pursuant to an employer/employee relationship between the inventors and the U.S. Department of Energy, operators of the National Energy Technology Laboratory (NETL).

BACKGROUND OF THE INVENTION

Capturing $CO_2$ from power plants that use fossil fuels is one of several strategies to reduce global $CO_2$ emissions. The task of removing $CO_2$ from power plant flue gas is challenging because existing methods for separate $CO_2$ from the gas mixture requires a significant portion of power plant output. The separation task can be simplified by replacing conventional air with pure oxygen so that the combustion products are just $CO_2$ and water, which may be easily separated by condensation. However, current commercial techniques for producing oxygen from air require very energy-intense cryogenic processes. Chemical looping combustion (CLC) is a novel combustion technology that utilizes an oxygen carrier, such as metal oxide, to transport oxygen from air to fuel, thereby avoiding direct contact between fuel and air. The significant advantage of CLC over conventional combustion is that CLC can produce a sequestration-ready $CO_2$ stream—not diluted by nitrogen (N2)—without expending any major energy required for the separation of $CO_2$. The overall CLC process, in which the metal oxide cycles between oxidized and reduced states, is exothermic. Several single metal oxides and bi-metallic oxides have been reported in the literature as oxygen carriers a promising bi-metallic oxygen carrier containing CuO and $Fe_2O_3$ for both methane and coal CLC.

Production of hydrogen from methane has received much attention because it is a promising energy source that is also environmentally benign. Hydrogen is used in oil refineries, for ammonia, methanol production, and fuel cells. Steam methane reforming (SMR) is currently the most popular commercial method of producing hydrogen. Synthesis gas produced in SMR must be further processed in the water-gas shift reactor to produce a gas stream containing $H_2$ and $CO_2$. An additional step is required to separate $CO_2$ and $H_2$ to produce pure $H_2$ and sequestration ready $CO_2$. The energy for the SMR process is provided via methane combustion in air which produces a $CO_2$ stream diluted with nitrogen and will require separation prior to sequestration.

Various researchers have reported on the production of hydrogen and synthesis gas using the chemical looping methane reforming process. Methane partial oxidation using an oxygen carrier is one of the processes reported for the production of synthesis gas. In this process, an oxygen carrier is used directly in the fuel reactor to partially oxidize hydrocarbons. Another process reported in the literature for hydrogen production via CLC includes initial reduction of the oxygen carrier with fuel, such as methane or synthesis gas, followed by steam oxidation to produce hydrogen via water splitting. A combination of partial oxidation with oxygen carriers and hydrogen production via water splitting on the reduced oxygen carrier is also reported. Other approaches reported include integration of a traditional hydrocarbon steam reformer with the CLC process, and a five step process to produce synthesis gas from the CLC process using NiO as the oxygen carrier and the reduced carrier as the steam reforming catalyst. The processes described in this disclosure use neither partial oxidation of methane nor hydrogen production via water splitting using steam oxidation.

Thermo-catalytic decomposition of methane to carbon and hydrogen has received attention because the process produces hydrogen directly without any additional gas processing. A recent systems analysis indicated that the cost of hydrogen production by thermal decomposition of methane is lower than the cost for the steam reforming process. Catalysts containing nickel and iron have been widely used for methane decomposition tests. In addition, carbon formed in the methane decomposition process has also a commercial value. This disclosure describes a process for producing hydrogen and carbon by methane decomposition on copper oxide-iron oxide catalysts coupled with methane CLC using a CuO—$Fe_2O_3$ oxygen carrier. This CuO—$Fe_2O_3$ is used as the oxygen carrier for the chemical looping process while the reduced CuO—$Fe_2O_3$ carrier is used for the catalytic decomposition process to produce hydrogen. The process produces a pure hydrogen stream and carbon along with a sequestration-ready $CO_2$ stream. In addition to pure hydrogen, steam gasification of carbon formed during methane decomposition produces a synthesis gas stream with the ratio of $H_2/CO$ of 2, which is suitable for chemical production.

The second process described in this paper occurs after the CLC process with the CuO—$Fe_2O_3$ oxygen carrier. The reduced oxygen carrier is used directly for the SM R process to produce synthesis gas, similar to the commercial steam reforming process with nickel-based catalysts. However, the heat required for the SMR process is supplied by the CLC reaction with the oxygen carrier. Syngas has many commercial applications: it can be used in the Fisher-Tropsch process to produce diesel, or converted into other useful chemicals such as methanol and dimethyl ether. Methanol is used as the feedstock for production of formaldehyde, acetic acid, propylene, and various esters, which are the chemical building blocks in the production of plastics, resins, pharmaceuticals, adhesives, paints, and much more. Nickel-based catalysts are traditionally used in the commercial steam reforming process and noble metal catalysts have also been reported. The reduced form of the CuO—$Fe_2O_3$ catalyst is environmentally benign unlike nickel catalysts, and the cost of the reduced CuO—$Fe_2O_3$ catalysts is significantly lower than noble metal catalysts used in steam reforming processes.

SUMMARY

This invention serves to address the need for improved production of synthesis gas and/or carb and hydrogen using a reduced catalyst CuO—$Fe_2O_3$.

One embodiment relates to a method for producing synthesis gas or carbon and hydrogen utilizing a reduced catalyst CuO—$Fe_2O_3$. The method comprises introducing $CH_4$; reducing the CuO—$Fe_2O_3$ with the introduced $CH_4$, yielding at least a reduced metal catalyst; oxidizing the reduced metal with $O_2$ yielding $CuO$—$Fe_2O_3$; and generating heat that would be used for the hydrogen and carbon or syngas production with the reduced catalyst $CuO$—$Fe_2O_3$.

Yet another embodiment relates to a method for producing synthesis gas or carbon and hydrogen. The method comprises reducing a $CuO$—$Fe_2O_3$ catalyst, yielding at least a reduced metal; generating heat by oxidation that would be used for the hydrogen and syngas or carbon production with the reduced catalyst $CuO$—$Fe_2O_3$; and producing a concentrated $CO_2$ stream that is sequestration ready while producing $H_2$ and C/syngas.

In summary, the $CuO$—$Fe_2O_3$ oxygen carrier has a dual function in the process. It is used in the methane reduction/air oxidation CLC process to provide energy for the endothermic methane decomposition process to produce hydrogen and elemental carbon or syngas while producing a concentrated sequestration-ready $CO_2$ stream. After reduction with methane, the reduced oxygen carrier also serves as a catalyst for the methane decomposition process to produce hydrogen and elemental carbon or syngas. The reduced oxygen carrier an also serves as a catalyst for the SMR process to directly form syngas.

BRIEF DESCRIPTION OF THE DRAWINGS

These and other features, aspects, and advantages of the multiple embodiments of the present invention will become better understood with reference to the following description, appended claims, and accompanied drawings where:

FIGS. 4a-4b illustrate graphs depicting CLC of Methane with Cu—Fe oxygen carrier at 800° C. including FIG. 4a illustrating a graph depicting reduction of Cu—Fe carrier with methane and FIG. 4b illustrating a graph depicting oxidation of reduced Cu—Fe carrier with air;

FIG. 12a illustrates a graph depicting Outlet gas composition during methane steam reforming with reduced $CuO/Fe_2O_3$-alumina oxygen carrier, FIG. 12b illustrates a graph depicting $H_2$/CO ratios during methane steam reforming with reduced oxygen carrier, and FIG. 12c illustrates a graph depicting oxidation with air (800° C. (cycle 3, 4 g catalyst, 20% methane/30% steam for reforming);

DETAILED DESCRIPTION OF THE INVENTION

Experimental

Bench-scale fixed-bed flow reactor tests were conducted to demonstrate the two processes. The oxygen carrier contained 30 wt. % CuO, 30 wt. % $Fe_2O_3/Al_2O_3$. The materials were tested in a fixed-bed flow reactor with an inner diameter of 13 mm. The $CuO$—$Fe_2O_3$ oxygen carrier (~4 g) was placed in the reactor to obtain a solid material bed height of about 2 cm. The particle size of $CuO$—$Fe_2O_3$ oxygen carrier is in the range of 100-150 microns with an average of 130 microns, and surface area was 12 $m^2$/g. For Process 1, reaction gases were 20% $CH_4$/He for the reduction/decomposition reaction; dry air for oxidation and 30% $H_2O$/He for carbon gasification were introduced in down flow mode at a flow rate of 90 sccm. A mass spectrometer (Peffier) was utilized for gas analysis from the outlet of the reactor. For Process 2, 20% $CH_4$/30% $H_2O$/He were used during the steam reforming step.

Results and Discussion

Production of hydrogen from methane decomposition coupled with CLC using $CuO$—$Fe_2O_3$ oxygen earner.

A method to produce pure hydrogen and carbon or syngas by catalytic methane decomposition coupled with CLC process is described. One unique feature in this process is that the oxygen carrier used for the CLC process is also used as a catalyst for methane decomposition after the initial reduction. Pure hydrogen maybe generated during the methane decomposition step. Carbon, produced from methane decomposition, may be used directly as a valuable product or gasified by steam to produce synthesis gas, which is a precursor for the production of many chemicals. Various reactor system designs suitable for carbon removal from methane decomposition can be applied in this process. If synthesis gas is not necessary, it can be re-introduced as a fuel for initial reduction of the oxygen carrier.

Figure 1:
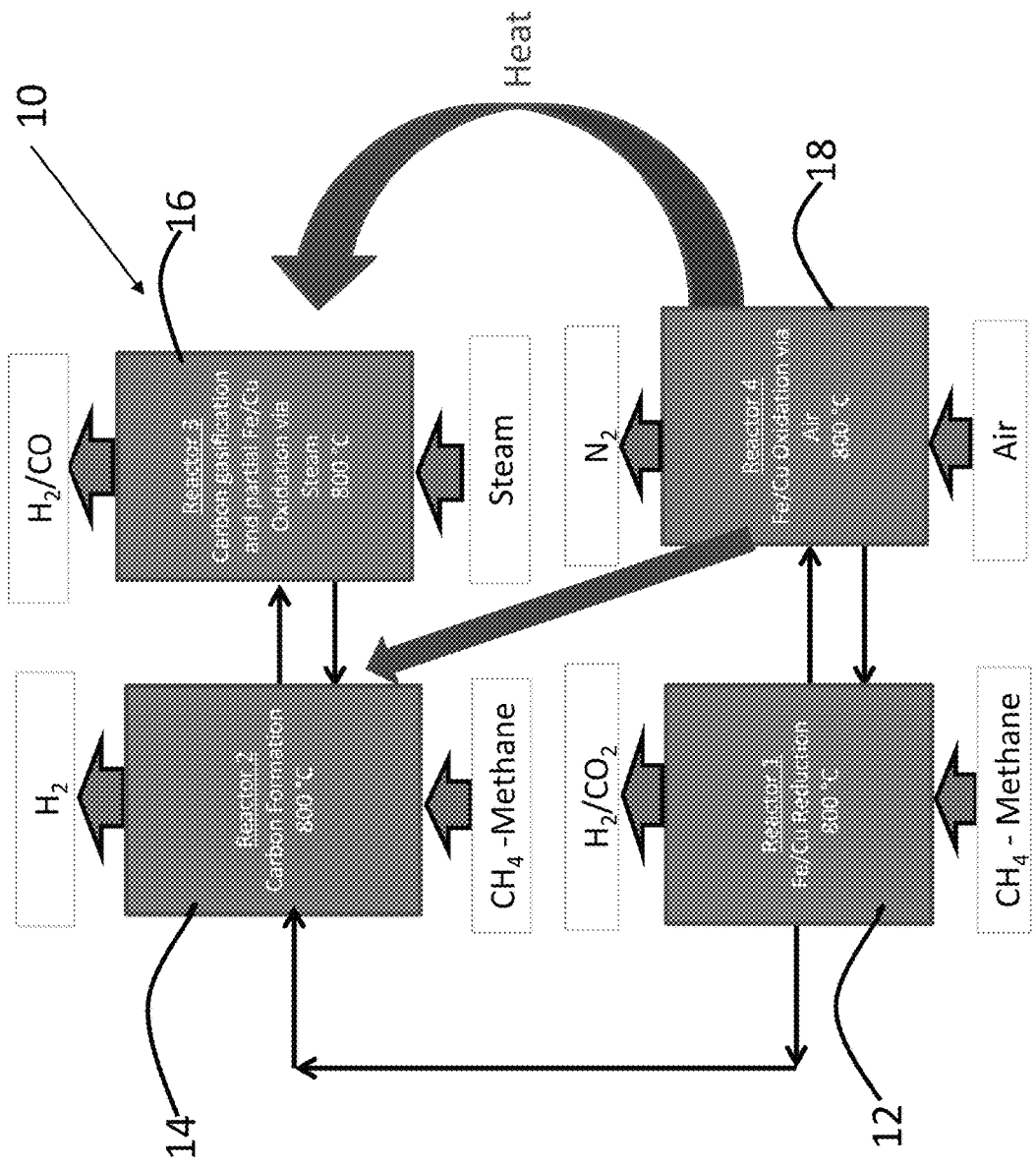
FIG. 1 illustrates a system and process for production of $H_2$ and synthesis gas (Option 1)
Figure 2:
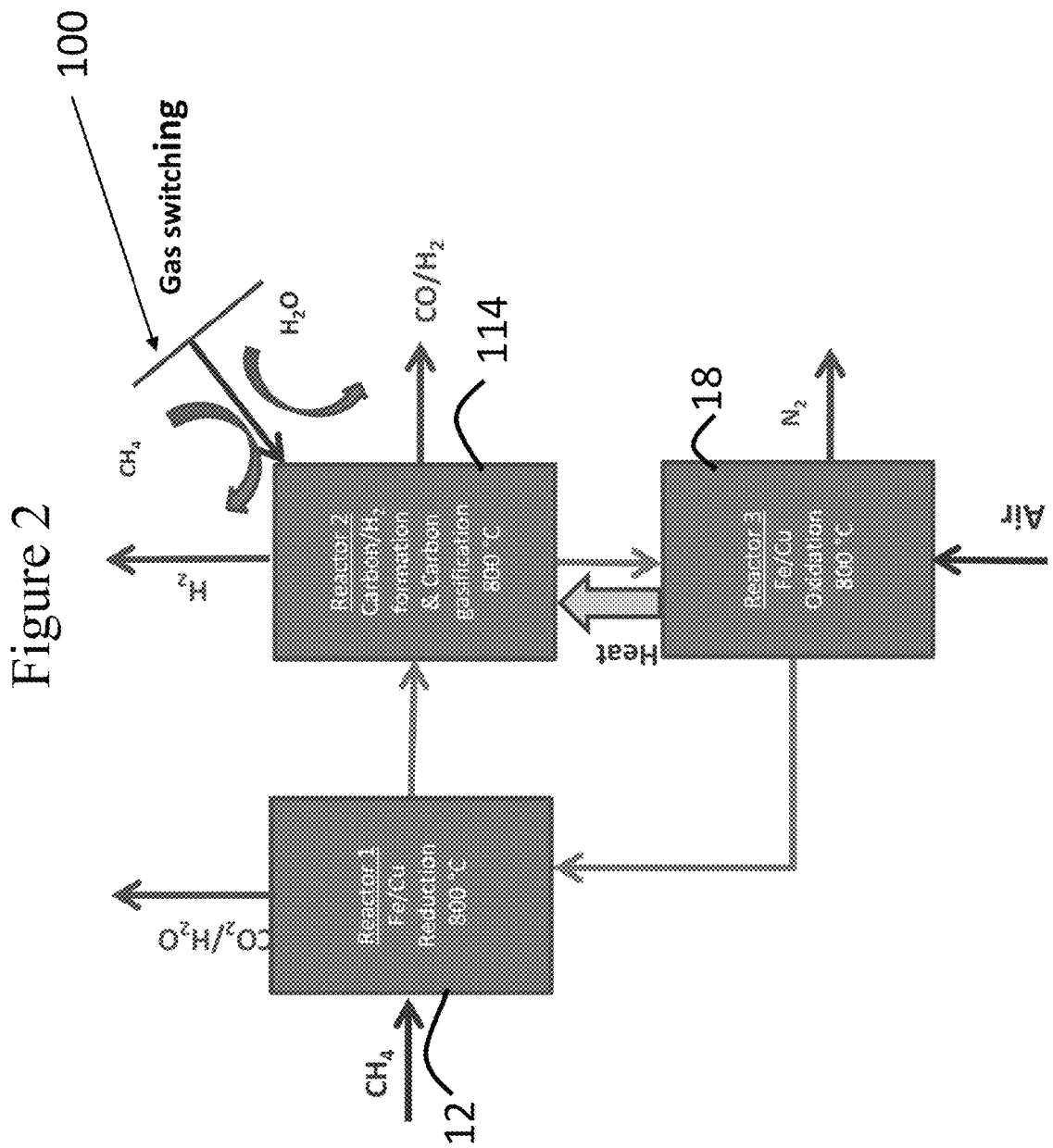
FIG. 2 illustrates another system and process for production of $H_2$ and synthesis gas (Option 2)
Figure 3:
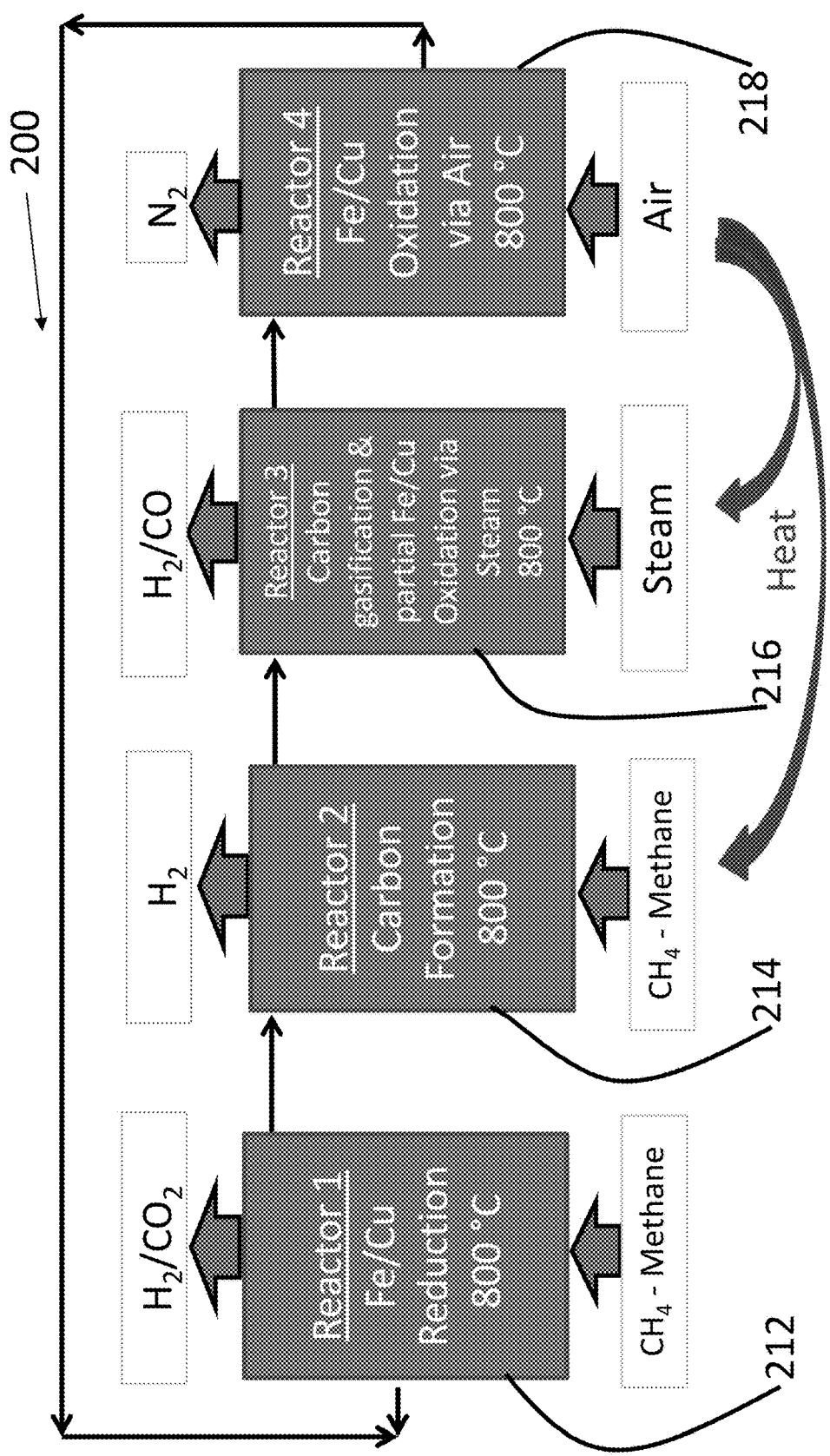
FIG. 3 illustrates a system and process for production of $H_2$ and synthesis gas (Option 3)

Three different options to produce pure hydrogen and synthesis gas from methane are shown in FIGS. 1-3. In the first option (generally designated 10 in FIG. 1), methane is introduced to the reactor 12 (reducer) for the reduction of the oxidized $CuO$—$Fe_2O_3/Al_2O_3$ oxygen carrier to produce a reduced carrier, $CO_2$, and $H_2O$ reaction, as described in following reaction:

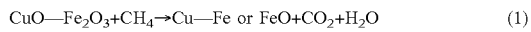

$$CuO\text{—}Fe_2O_3+CH_4 \rightarrow Cu\text{—}Fe \text{ or } FeO+CO_2+H_2O \tag{1}$$

When the oxygen carrier does not produce any $CO_2$ or CO, but rather starts to generate hydrogen, a portion of the reduced oxygen carrier is transferred to reactor 14 in which methane decomposition (reaction 2) takes place.

$$CH_4 \rightarrow C+2H_2 \tag{2}$$

The other portion of the reduced oxygen carrier is transferred to reactor 16 (oxidizer) in which air is introduced for oxidation (reaction 3).

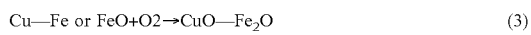

$$Cu\text{—}Fe \text{ or } FeO+O2 \rightarrow CuO\text{—}Fe_2O \tag{3}$$

Since the methane decomposition reaction is endothermic, heat for the reaction will be provided by the exothermic reaction 3 from the oxidizer reactor 16. Carbon deposited on the oxygen carrier by methane decomposition can be removed to obtain valuable carbon products or it can be transferred to reactor 18 in which steam is introduced to gasify the carbon to form synthesis gas (reaction 4) 18.

$$C+H_2O \rightarrow CO+H_2 \tag{4}$$

The reduced metal oxide may also serve as a water-gas shift catalyst to convert some carbon monoxide with water to produce hydrogen and $CO_2$. Then the carbon-free catalyst can be re-introduced to reactor 14 to form hydrogen. The synthesis gas produced from carbon in reactor 4 can be either used for applications to produce valuable chemical products or reintroduced as fuel for the CLC reducer, reactor 12.

FIG. 2 illustrates Option 2, generally designated 100, where reactions 1 and 2 may also be performed in a single reactor 114 instead of two reactors (reactors 14 and 16 in FIG. 1) by switching gas between methane and steam, as illustrated in FIG. 2. FIG. 3 illustrates Option 3, in which the process may also be performed in a four-step sequence (including reactors 212, 214, 216 and 218) as illustrated in FIG. 3 (Option 3). The individual steps in this process with the $CuO$—$Fe_2O_3/Al_2O_3$ oxygen carrier were experimentally evaluated.

Figure 4A:
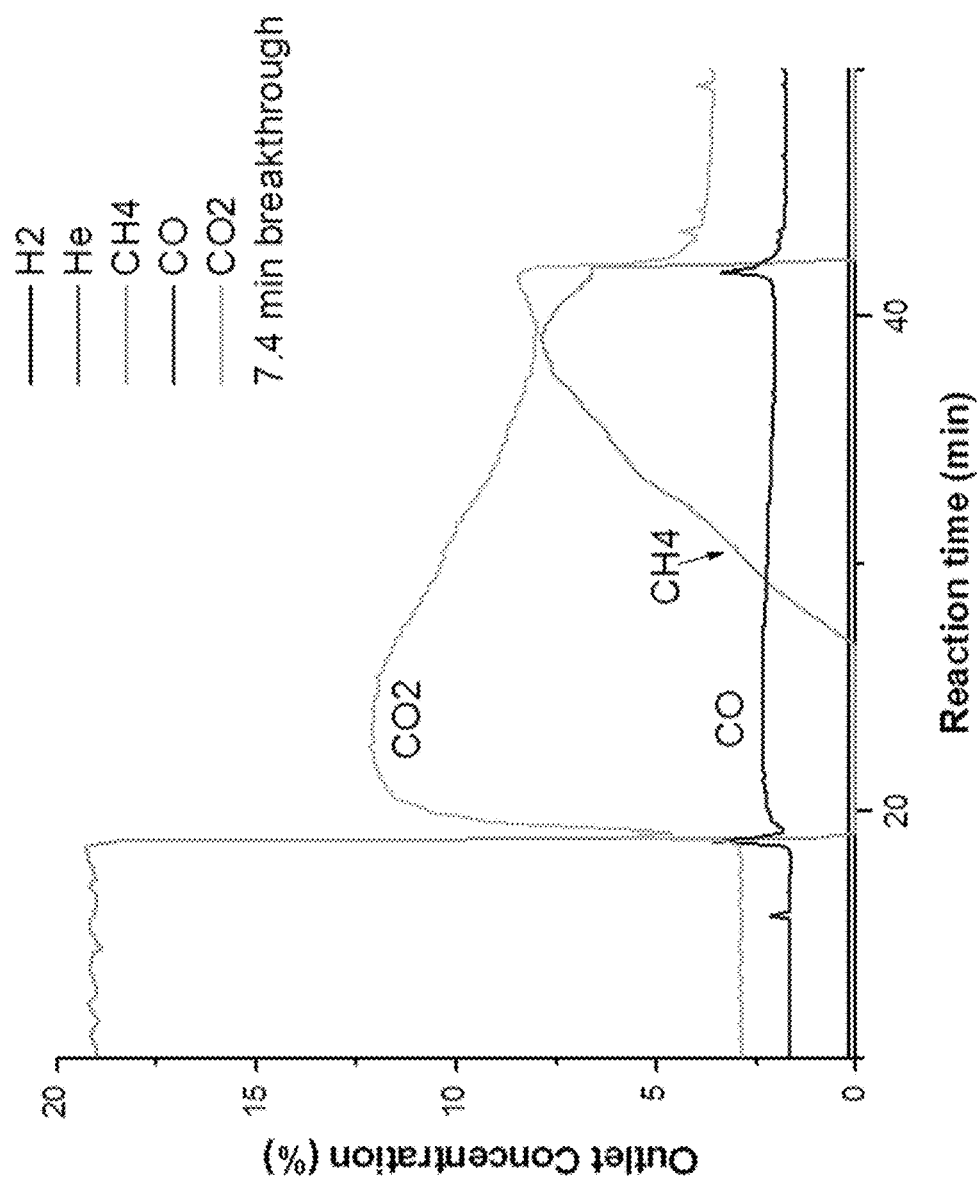

Experimental Data for Production of Hydrogen from Methane Decomposition Coupled with CLC Using a $CuO$—$Fe_2O_3$ Oxygen Carrier Two step reactions, reduction with methane and oxidation with air at 800° C., were conducted demonstrating the CLC reactions with the oxygen carrier, and the results are illustrated in FIG. 4 (See FIGS. 4a-4B). Methane was fully combusted by the oxygen carrier to form $CO_2$ and water during reduction and was fully oxidized during oxidation with air. This material has been tested for 50 cycles in a fluidized bed reactor and stable reactivity was observed. Attrition resistance of the material was also better than that of the standard fluid catalytic cracking (FCC) catalyst (ASTM-5757-95 jet attrition method) after the 50 cycle test. These experimental data demonstrated that the $CuO$—$Fe_2O_3$ oxygen carrier is suitable for the CLC reactions required for the process with methane in reactor 12 (reducer) and oxidation with air in reactor 18 (oxidizer).

Figure 5A:
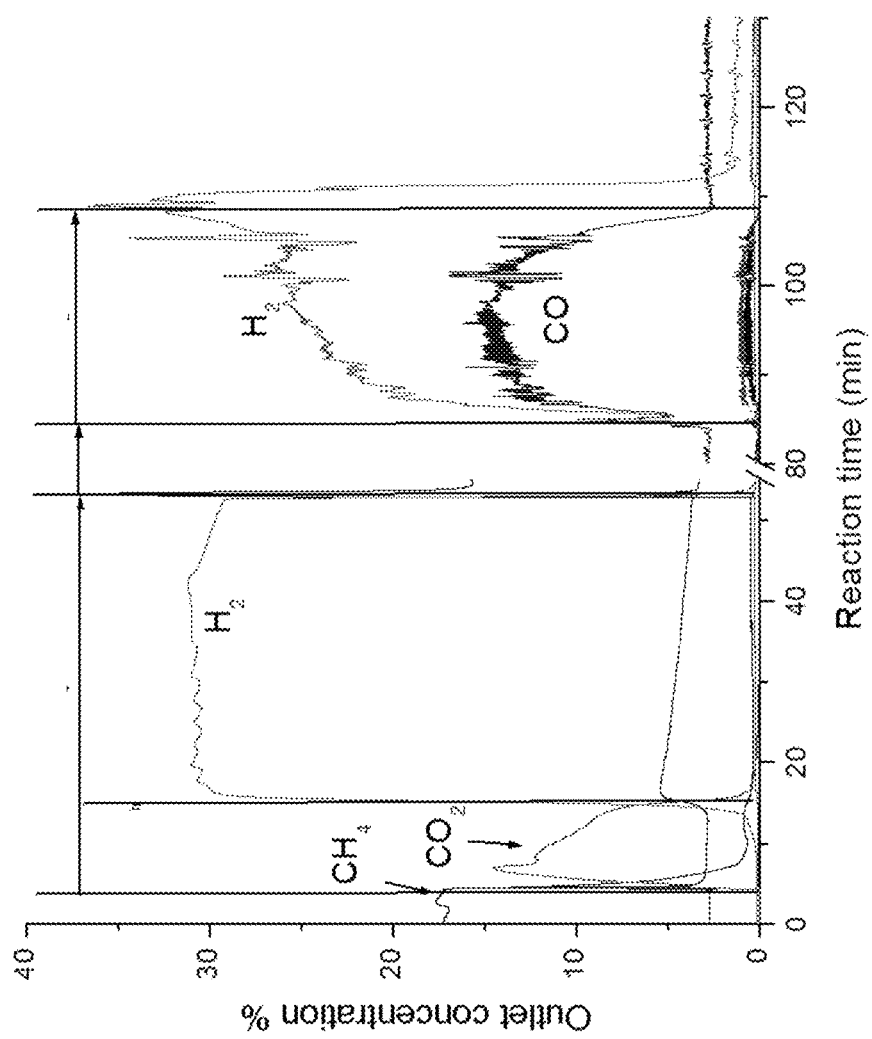
FIGS. 5a-5b illustrate graphs depicting Cycle 1 at 800° C. including FIG. 5a illustrating a graph depicting methane decomposition to produce $H_2$ and carbon gasification with steam with reduced Cu—Fe carrier and FIG. 5b illustrating a graph depicting oxidation of Cu—Fe carrier with air as in process.
Figure 5B:
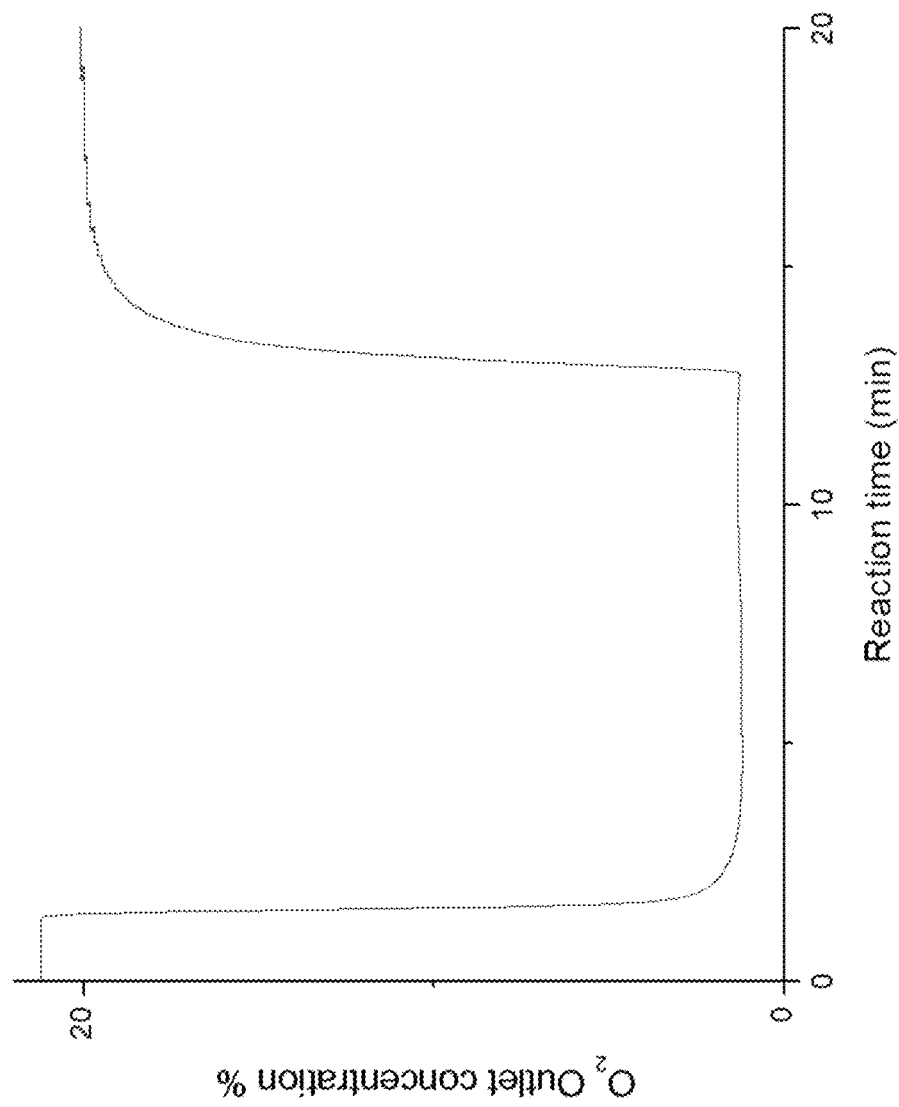

Reactor tests were also conducted to demonstrate the four stepsrequired for generating pure hydrogen and hydrogen/carbon monoxide. After the initial reduction, methane flow was continued for methane decomposition, and the data on methane decomposition to form hydrogen and carbon are illustrated in FIGS. 5a-5b; complete conversion of methane to produce pure hydrogen was observed during this step. It should be appreciated that CO was not observed during this step, indicating that the oxygen carrier in the reduced form does not supply oxygen but only acts as a catalyst for the methane decomposition reaction. To avoid undesirable pressure build up and flow restrictions, the methane decomposition step was limited to 35 minutes in the fixed bed tests even though the reduced oxygen carrier was still active for the complete methane decomposition process to produce hydrogen. Various reactor system designs suitable for carbon removal from methane decomposition have been reported in the literature. After 35 minutes of pure hydrogen production with 100% conversion of methane, steam was introduced to the catalyst to gasify carbon formed during the reaction. Synthesis gas was formed during steam gasification of elemental carbon at 800° C. The steam gasification step was not difficult since gasification involved elemental carbon that was deposited on the surface of the reduced oxygen carrier. The results during steam introduction are also shown in FIGS. 5a-5b. The oxygen carrier was then oxidized with air; results for the oxidation step are also shown in FIGS. 5a-5b (where FIG. 5a illustrates a graph depicting methane decomposition to produce $H_2$ and carbon gasification with steam with reduced Cu—Fe carrier as outlet concentration % versus reaction time in minutes and FIG. 5b illustrates a graph depicting oxidation of Cu—Fe carrier with air as in process as $O_2$ outlet concentration % versus reaction time in minutes).

Figure 6A:
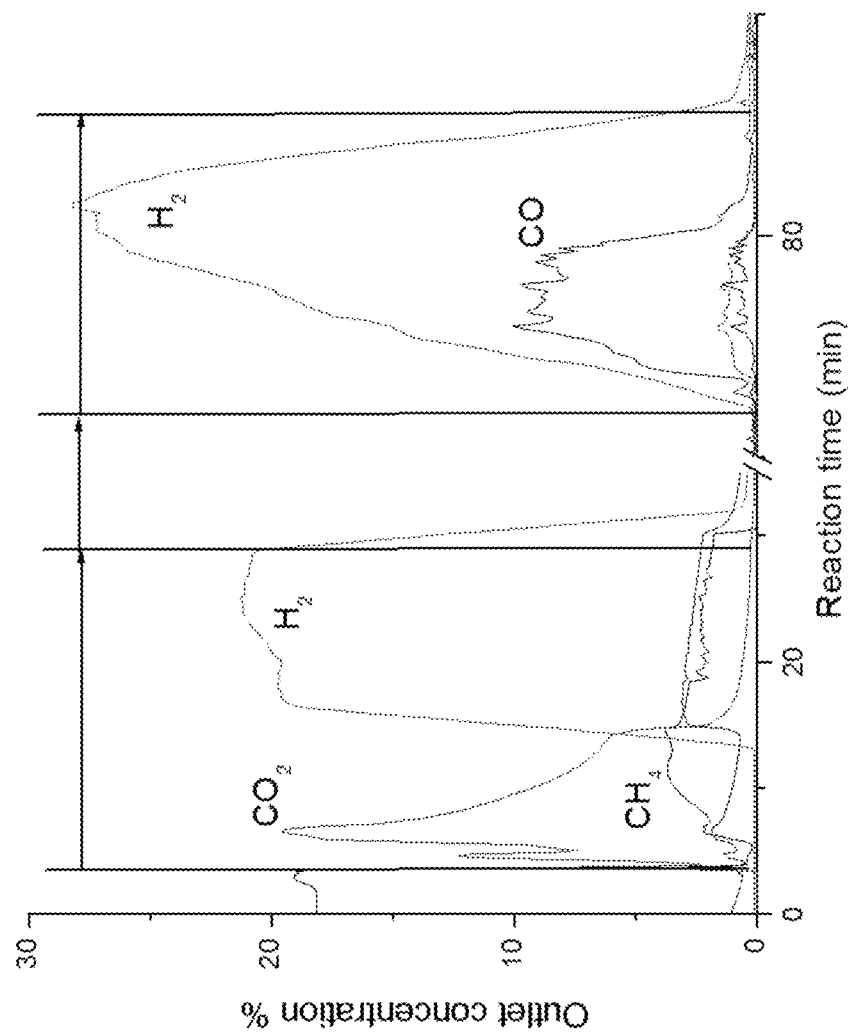
FIGS. 6a-6b illustrate graphs depicting cycle 4 at 800° C. including FIG. 6a illustrating a graph depicting methane decomposition to produce $H_2$ and carbon gasification with steam with reduced Cu—Fe carrier and FIG. 6b illustrating oxidation of Cu—Fe carrier with air as in process.
Figure 6B:
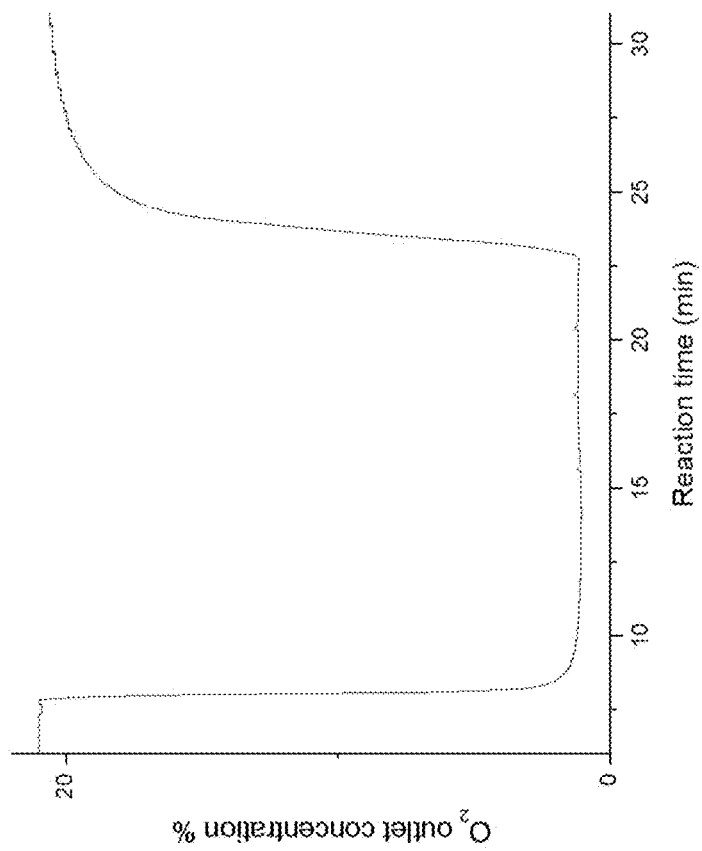

This reaction sequence-reduction, methane decomposition to form hydrogen, steam gasification of carbon and oxidation with air-was conducted for four cycles and the results for the fourth cycle is shown in FIG. 6a-6b (where FIG. 6a illustrates a graph depicting methane decomposition to produce $H_2$ and carbon gasification with steam with reduced Cu—Fe carrier as outlet concentration % versus reaction time in minutes and FIG. 6b illustrating oxidation of Cu—Fe carrier with air as in process as $O_2$ outlet concentration % versus reaction time in minutes).

The results shown in FIGS. 5a-5b and 6a-6b indicated stable performance during the cyclic tests. The summary of the four-cycle tests at 800° C. is shown in Table 1. Consistent performance was observed during the cyclic tests, as shown in Table 1.

When this reaction sequence was conducted at 700° C., hydrogen formation was observed during the methane decomposition step and synthesis gas was formed during the carbon gasification step with steam similar to what was observed at 800° C. However, methane was not fully consumed during the methane decomposition step at 700° C., as was observed at 800° C.

Figure 7:
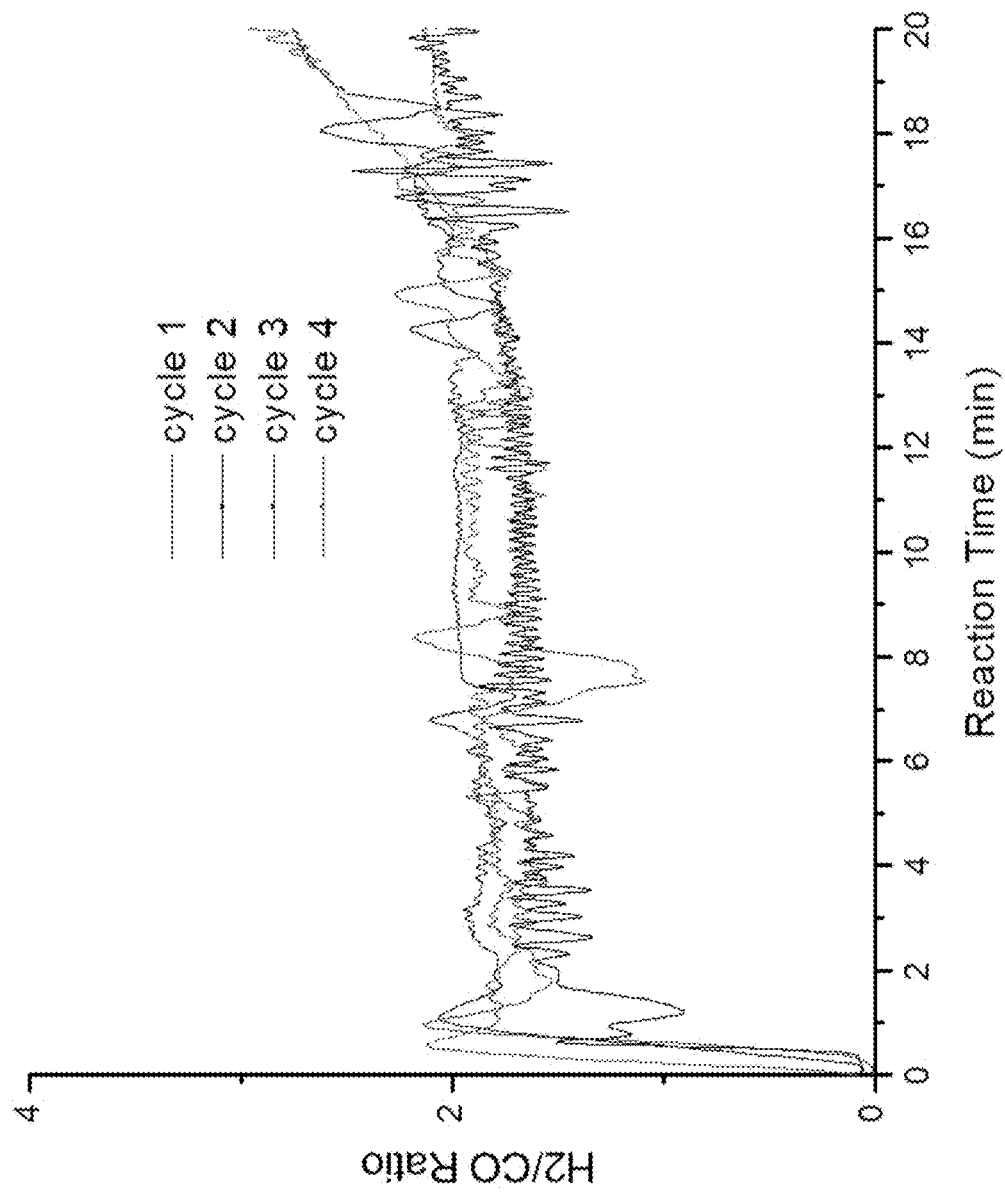
FIG. 7 illustrates a graph depicting $H_2$/CO composition during the carbon gasification state at 800° C.

Hydrogen/carbon monoxide ratios during carbon gasification with steam at 800° C. are shown in FIG. 7. The ratio remains close to 2 during this step, which is a desirable hydrogen/carbon monoxide ratio for further processing of synthesis gas to produce chemicals, such as methanol or formaldehyde. Therefore, syngas formed during carbon gasification can be used for production of useful chemicals.

Figure 8:
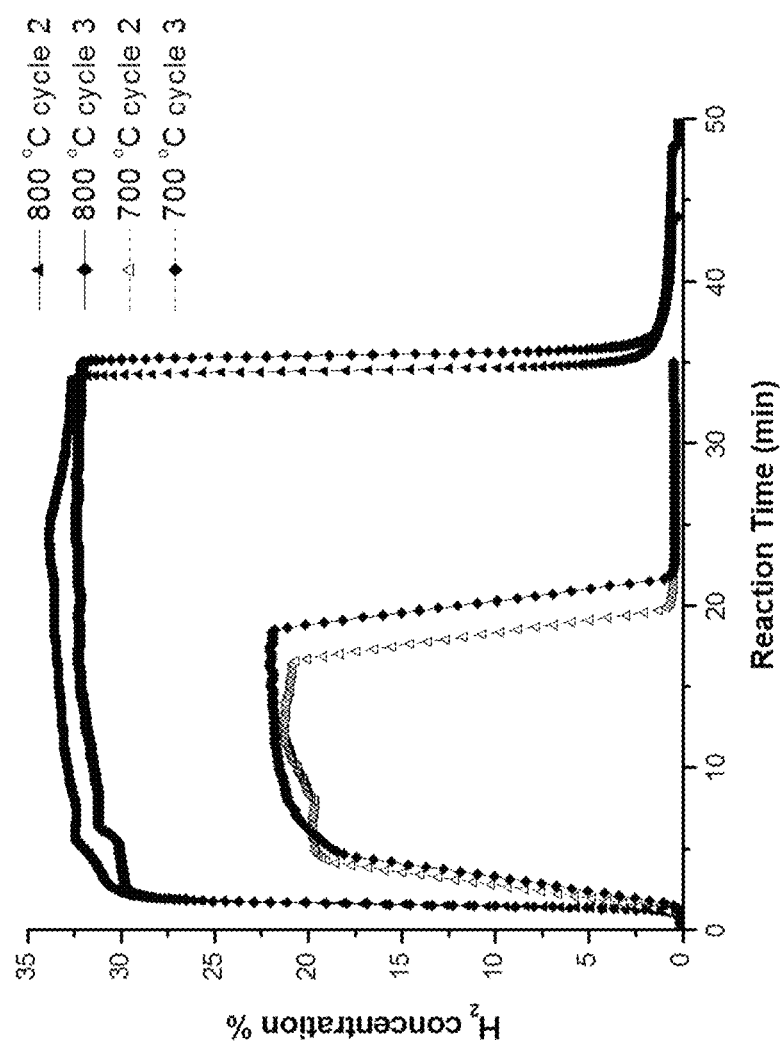
FIG. 8 illustrates a graph depicting comparison of the $H_2$ production during the methane decomposition step at 700° C. and 800° C.
Figure 9:
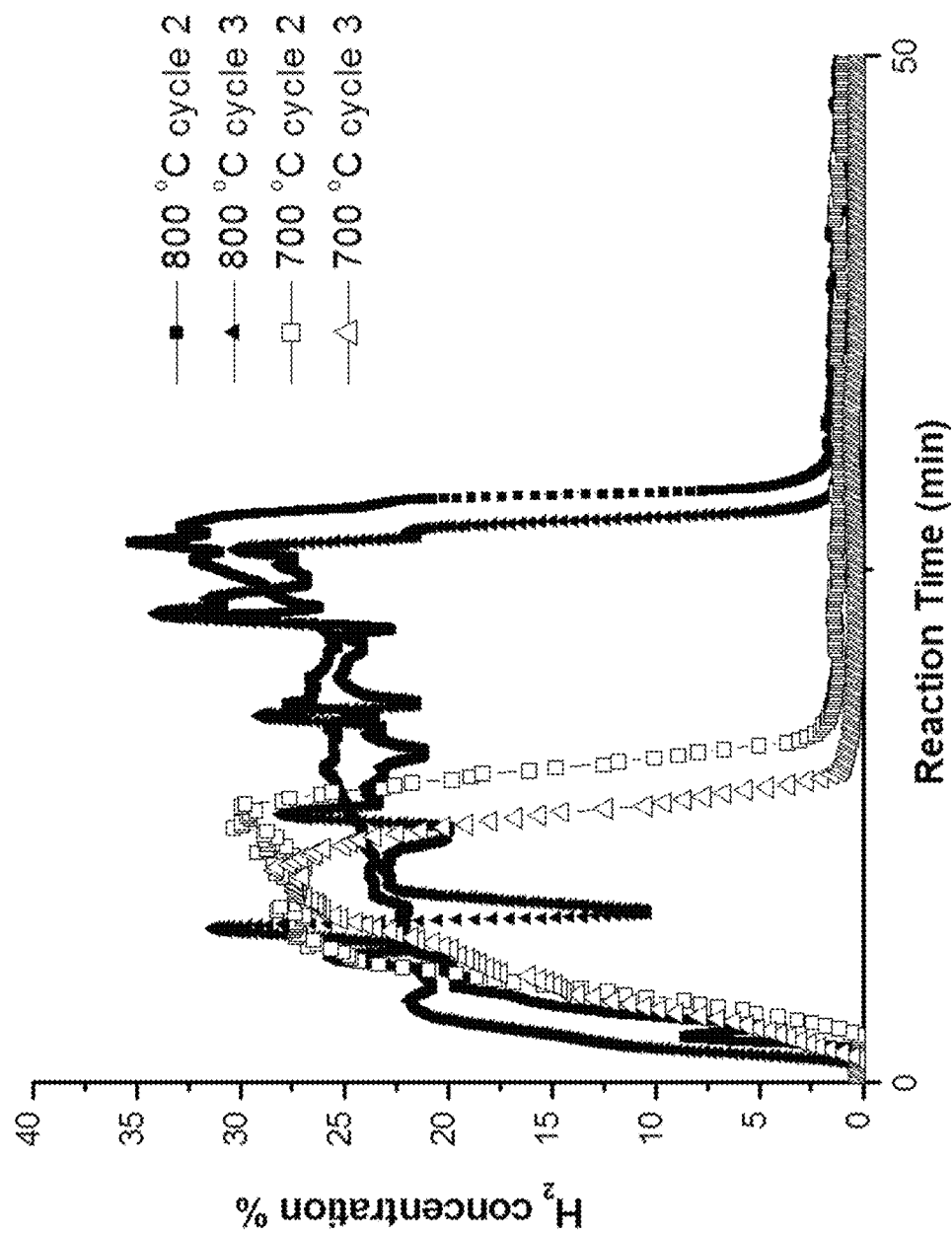
FIG. 9 illustrate a graph depicting comparison of the $H_2$ concentration during carbon gasification step at 700° C. and 800° C.

Comparative data on hydrogen production during the methane decomposition step at 700° C. and 800° C. are shown in FIG. 8. It is clear that conditions for producing pure hydrogen are more favorable at 800° C. At this temperature, the hydrogen concentration from the methane decomposition reaction remained same even after 30 minutes, but at 700° C. the hydrogen concentration decreased after 20 minutes. Lower reaction rates of methane decomposition and lower initial reduction of the oxygen carrier with methane at 700° C. may have contributed to the lower performance at 700° C. compared to 800° C. Hydrogen concentrations during the steam gasification step at 800° C. were similar to concentrations at 700° C. as shown in FIG. 9 indicating that the gasification reaction was feasible even at a lower temperature.

Energy Analysis of the Process of Hydrogen Production from Methane Decomposition Coupled with CLC Using a $CuO$—$Fe_2O_3$ Oxygen Carrier The four reactions-methane reduction, methane decomposition, and carbon gasification and oxidation reactions- were combined into two reaction schemes as follows:
Reaction scheme A: Methane decomposition and carbon gasification $CH_4 = C + 2H_2$ $$C + H_2O = CO + H2$$

$$CH_4 + H_2O \rightarrow CO + 3H2$$

$$CH_4 + \text{Metal oxides} = CO2 + H_2O + \text{reduced metal} \quad (5)$$

Reaction Scheme B: Reduced metal $+ O_2 =$ Metal oxides $$CH_4 + 2O_2 = CO2 + 2H2O \quad (6)$$

FIG. 1 depicts a schematic where the reduced CLC oxygen carrier is also utilized as the catalyst for the two-step methane decomposition/steam gasification reaction. In this process, the CLC reaction provides energy to the two-step methane decomposition/steam gasification process. The heat of reactions for the two-step methane decomposition/steam gasification (reaction 5-scheme A) and the overall CLC process (reaction 6-scheme B) at various temperatures are summarized in Table 2. Reaction scheme A consists of two reactions: the first reaction is a coking reaction, which is depicted as occurring in reactor 2 in FIG. 1. This reaction results in pure hydrogen production. The second reaction in scheme A is the oxidation of carbon deposited on the carrier/catalyst surface (reactor 16 in FIG. 1) via steam oxidation to produce synthesis gas. Both of these reactions are endothermic requiring energy to be sustained. For example, 226.4 kJ (Table 2) is required per a mole of methane at 800° C. for two-step methane decomposition/ steam gasification (reaction 5-scheme A) occurring in reactors 14 and 16 (FIG. 1). To provide the energy required for two-step methane decomposition/steam gasification, CLC is intimately integrated as heat source. The CLC process is shown FIG. 1 occurring in reactors 12 and 18. The overall heat of the reaction for the CLC process, shown as reaction B at 800° C. is -800.9 kJ per mole of oxygen (Table 2). The CLC process may also provide heat for steam generation, which has been intimately integrated here by providing indirect heat to reactor 14 and direct steam for reactor 16. While the heat duty required to carry two-step methane decomposition/steam gasification is similar to the heat duty of a traditional SMR scheme, the addition of CLC provides a sequestration ready high-purity $CO_2$ stream. In a traditional SMR process, combustion of methane is necessary to produce the heat required for the endothermic SMR reaction that generates $CO_2$, which is not sequestration ready.

An additional energy savings is also realized in the proposed two-step methane decomposition/steam gasification due to the elimination of the water-gas shift reaction step to produce hydrogen and the $CO_2$ separation step. In a traditional commercial SMR process, methane is reacted with steam directly in the SMR reactor and then processed through a water-gas-shift reactor to produce a hydrogen and $CO_2$ stream. Additional separation techniques must be implemented to separate the $CO_2$ and create a high-purity hydrogen stream. In the proposed process, hydrogen can be produced without any additional separation process. The proposed process also produces synthesis gas, which can be used for production of specialty chemicals.

Coupling reaction schemes A and B, 1 mole of oxygen from the CLC process produces 2 moles of pure hydrogen and synthesis gas containing 1 mole of hydrogen and 1 mole of carbon monoxide. Synthesis gas composition can vary since the reduced Fe—Cu oxide can also act as a water-gas shift catalyst that can convert some carbon monoxide to hydrogen. In addition, partial oxidation of the reduced catalyst by water can form additional hydrogen. Moles of oxygen involved in the CLC reaction B to provide heat for the endothermic methane decomposition and carbon gasification reactions are also listed in Table 2. Our experiments determined the oxygen transfer capacity of the $CuO$—$Fe_2O_3$ oxygen carrier to be 13 wt % at 800° C. The weights of the $CuO$—$Fe_2O_3$ oxygen carrier necessary to produce 3 moles of hydrogen and one mole of carbon monoxide from 2 moles of methane are also listed in Table 2. To produce the same quantity of hydrogen (1M scf/day) that is produced from a commercial SMR process in the chemical and oil industry, the solid circulating rate of the process in the current paper need only be 266 pounds of solid per hour or only 31.4 g of oxygen carrier per liter of feedstock, which is significantly less than the 5 kg per kg of feedstock used in commercial fluidized catalytic cracking processes.

Therefore, designing a commercial-scale reactor system with solid processing for the current proposed process will not be difficult.

A techno-economic analysis reported in the literature showed that hydrogen could be produced by thermal decomposition of methane at a lower cost than with the commercial steam reforming process. In the process described in this paper, methane decomposition to produce hydrogen is also combined with both synthesis gas production and CLC to produce sequestration-ready $CO_2$ which will contribute to even more cost savings than reported in the techno-economic analysis, if $CO_2$ sequestration is considered as part of the process.

Production of Synthesis Gas Directly from Methane Steam Reforming Coupled with CLC Using a $CuO$—$Fe_2O_3$ Oxygen Carrier Methane steam reforming is a well-established process. Steam and hydrocarbon enter the reactor as feedstock, and hydrogen and carbon monoxide are generated at the end of the process. The process is governed by reactions 5 and 7.

$$CO + H_2O \rightarrow CO_2 + H_2 \quad \Delta H_{298}^m = -41.2 \text{ kJ/mol} \quad (7)$$

The steam re-forming step, where methane reacts with water to produce carbon monoxide and hydrogen, is an endothermic process. Thus, the process is usually maintained at approximately 850° C. to obtain a desirable conversion. The second step is known as the water-gas shift reaction where syngas reacts to recover hydrogen if the desired product is hydrogen instead of synthesis gas.

For direct steam reforming, usually either nickel or noble metals, such as ruthenium, rhodium, palladium, iridium, platinum, are used as the active metal in catalysts. Nickel is the preferred metal for industrial steam reforming applications because of its activity, availability, and low cost. Methane is activated on the nickel surface. The resulting CHx species then reacts with OH species (from $H_2O$) adsorbed on the nickel or on the support to form the synthesis gas. However, it should be noted that nickel is not environmentally benign since it is a suspected carcinogen. The nickel oxide catalyst is initiated by hydrogen reduction so that the surface active site of metallic nickel could be exposed. Moreover, the industrial reformer must contain a methane combustor to provide heat for the endothermic reforming reaction. All these processes which use air for methane combustion produce $CO_2$ that is not sequestration ready. In the process described in this paper, the CLC process produces sequestration ready $CO_2$ using a $CuO$—$Fe_2O_3$ oxygen carrier that provides heat for the steam reforming of methane. The reduced $CuO$—$Fe_2O_3$ oxygen carrier is also the catalyst for the methane reforming step.

Figure 10:
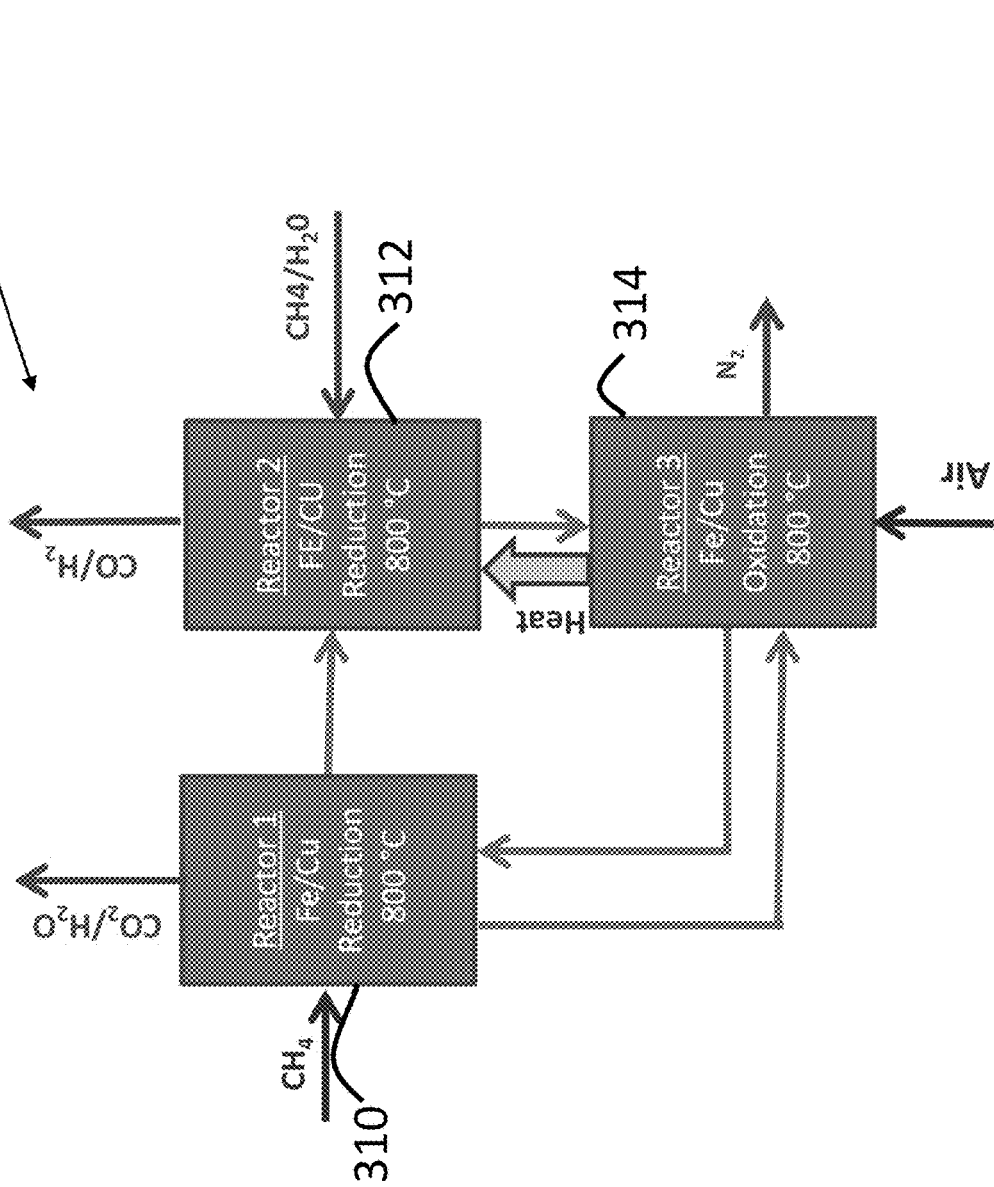
FIG. 10 illustrates a system and process (Process 2) for reduction-steam reforming-oxidation.

Process Steps Involved in Production of Synthesis Gas Directly from Methane Steam Reforming Coupled with CLC Using a $CuO$—$Fe_2O_3$—$Al_2O_3$ Oxygen Carrier The proposed process is shown in FIG. 10. The process, generally designated 300, consists of three reactors, 310, 312, 314. In reactor 310, oxygen carrier reduction occurs with methane, as in a traditional CLC process. The reduced oxygen carrier is then transferred to a steam reformer 312 in step 2. Then the reduced oxygen carrier acts as a steam reforming catalyst to produce synthesis gas according to the reaction (5). Depending on the steam content, the reduced oxygen carrier catalyst may also promote a water-gas shift reaction (7) to convert some carbon monoxide to hydrogen. In addition to acting as a catalyst, the fully reduced oxygen carrier also gets partially oxidized by steam during the steam reforming process.

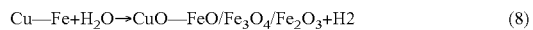

$$Cu\text{—}Fe + H_2O \rightarrow CuO\text{—}FeO/Fe_3O_4/Fe_2O_3 + H_2 \qquad (8)$$

Figure 11:
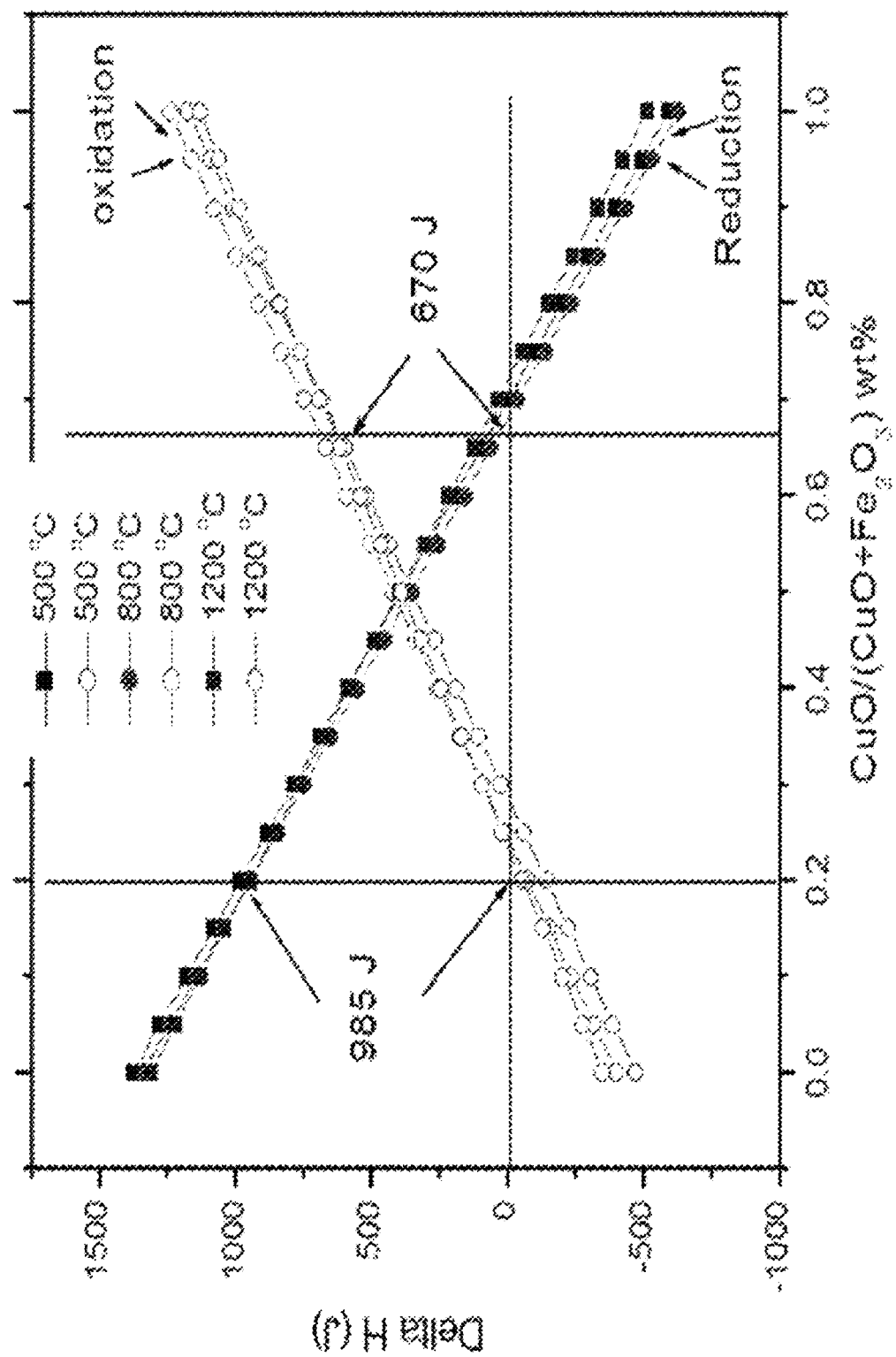
FIG. 11 illustrates a graph depicting thermodynamic (heats of reactions by Factsage 6.0) and analysis of reduction with methane ($CH_4 + 4MeO = CO_2 + 4Me + 2H_2O$) and oxidation with steam ($Me + H_2O = MeO + H_2$) as a function of various compositions of $CuO/Fe_2O_3$.

The heats of the reaction used for steam reduction and oxidation as a function of the Cu to Fe ratio are shown in FIG. 11. When the Cu content is high, the reduction reaction is exothermic, and oxidation with water is endothermic. When the Fe content is high, the reduction reaction is endothermic, and the steam oxidation reaction is exothermic. For the illustrated process, heat from the CLC oxidation reaction (reactor 314] must be supplied for either the reduction reactor (reactor 310) or the methane steam reformer (reactor 312), depending on the composition of the oxygen carrier. When the copper content is high, heat from reaction 314 for CLC air oxidation must be used for steam reforming reaction 5, since steam oxidation reaction 8 is endothermic and the CLC reduction reaction 310 is exothermic. When the iron content is high, heat for air oxidation will be used mainly for CLC reduction reaction 1 since the majority of the heat required for the steam reforming reaction 5 can be provided by the steam oxidation reaction 8, which is exothermic.

Figure 12A:
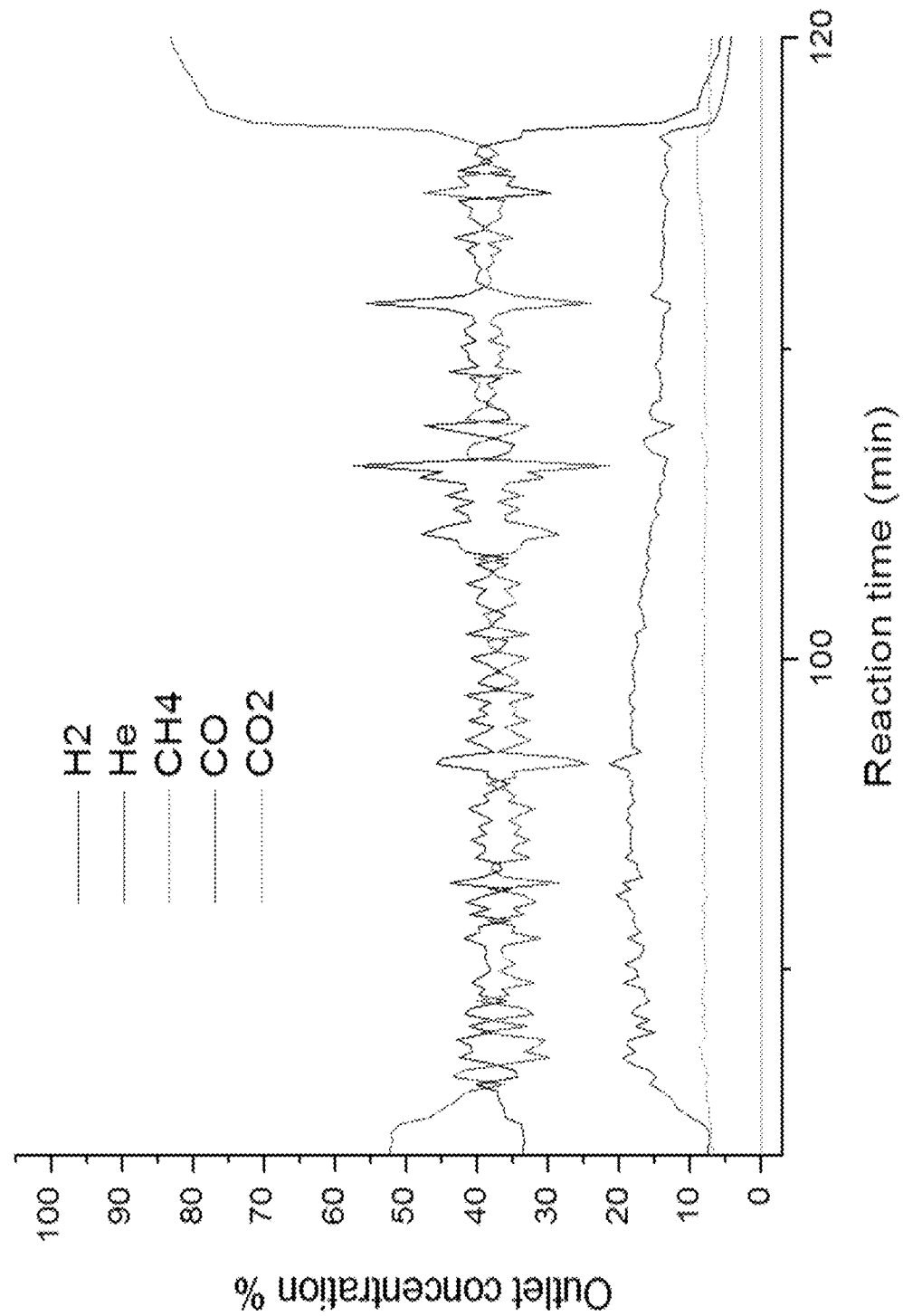
FIG. 12a-12c illustrate graphs depicting bench-scale flow reactor test data for process 2 including
Figure 12B:
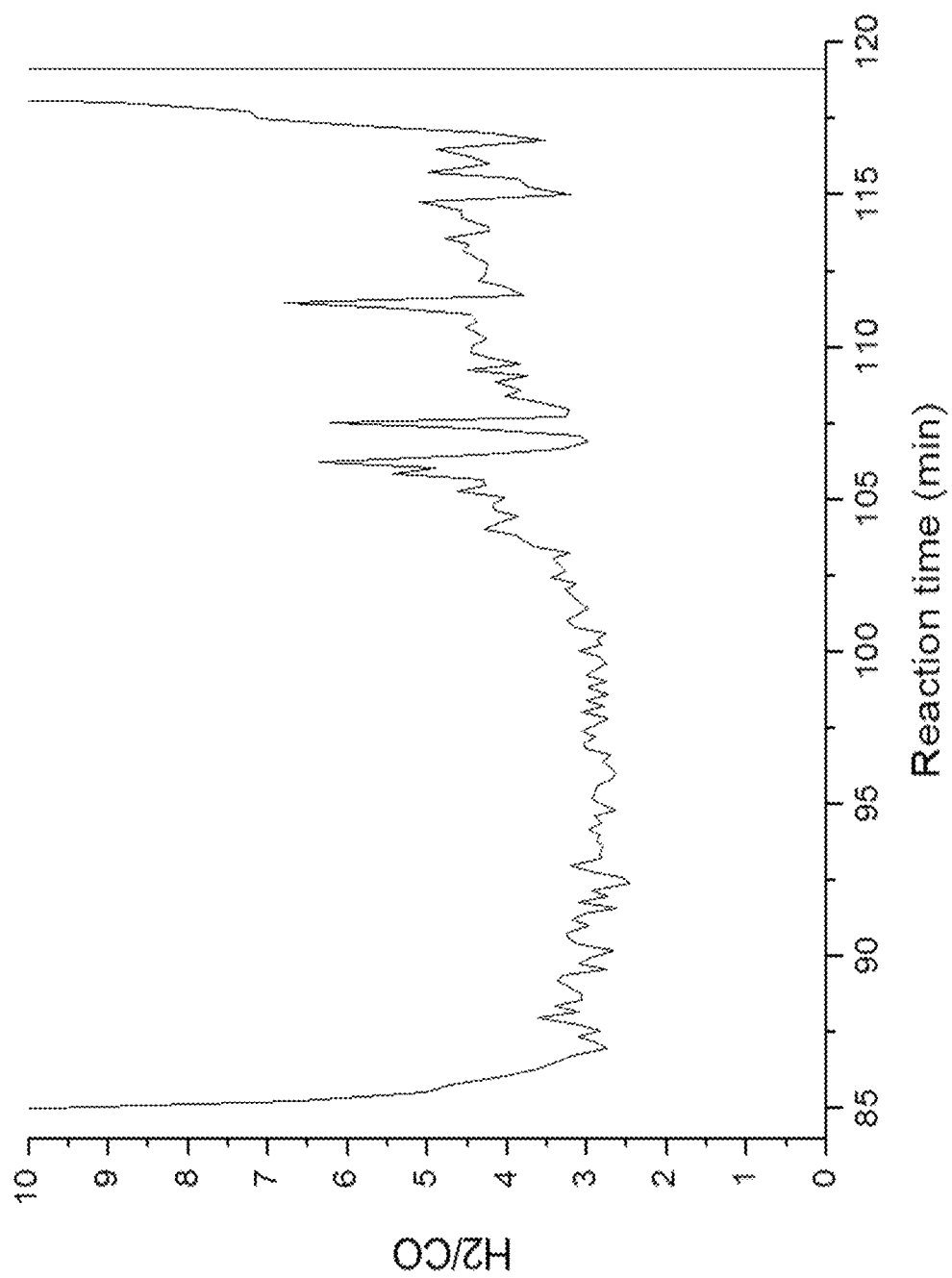
Figure 12C:
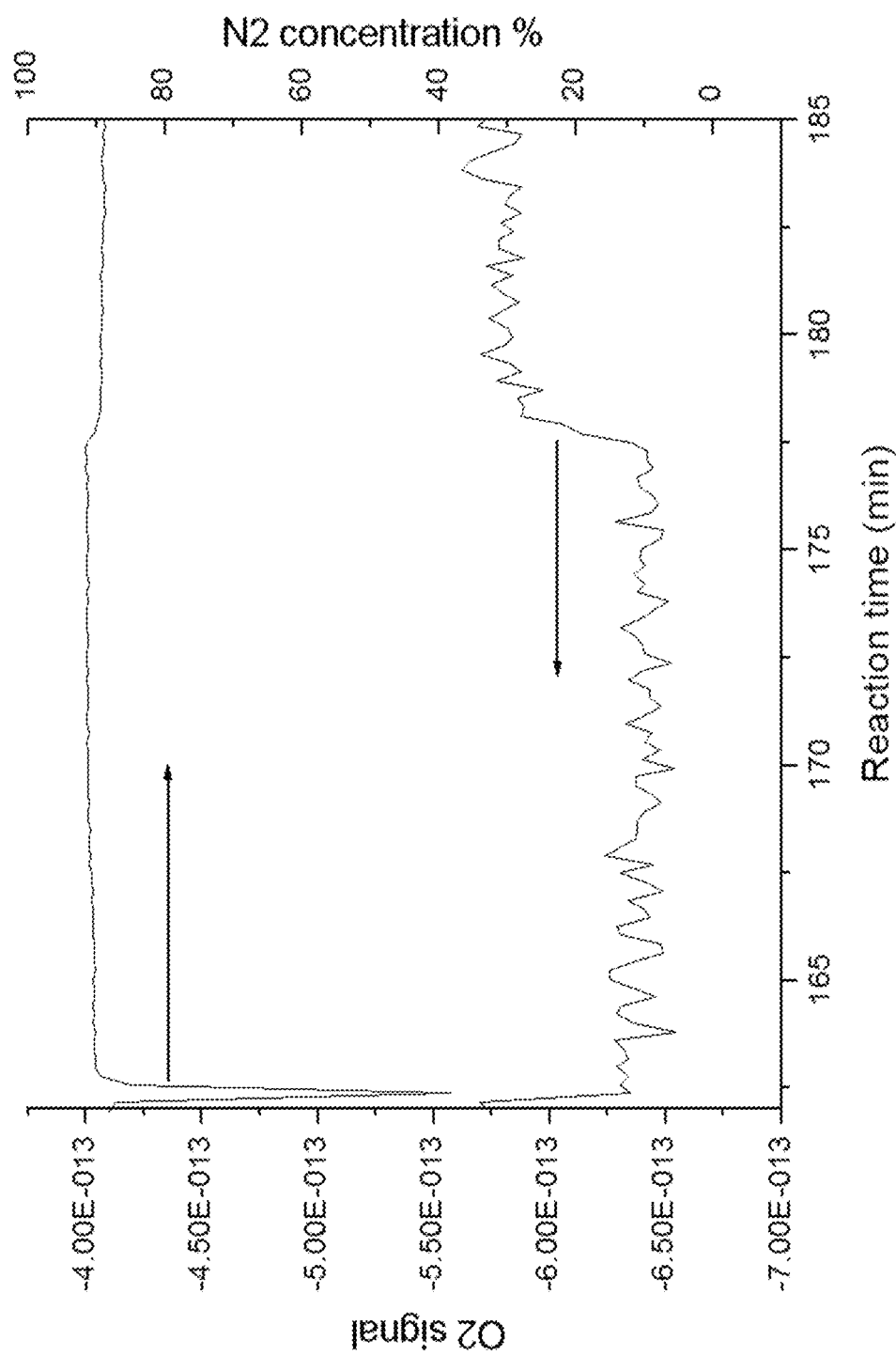

Experimental Data Involved in Producing Synthesis Gas Directly from Methane Steam Using $CuO$—$Fe_2O/Al_2O_3$ Oxygen Carrier/Catalyst The process was experimentally verified in the bench-scale reactor. The initial reduction of the oxygen carrier (4 g) was performed with 20% $CH_4$/He for 11 min. at 800 C, which corresponded to 15% oxygen transfer capacity and possible oxidation states of $Cu^0$ and $Fe^0$ Then, the methane steam reforming reaction step 2 was performed with 20% $CH_4$/30% $H_2O$/He at 800° C. for 120 mins; the results are shown in FIG. 12. Oxidation was then performed at 800° C. for 16 min with air, also shown in FIG. 12. Oxidation time was 16 min, which corresponded to 11% oxygen transfer indicating that the reduced oxygen carrier was also partially oxidized by steam during the steam reforming step in which steam supplied 4% of the oxygen foroxidation.

Figure 13:
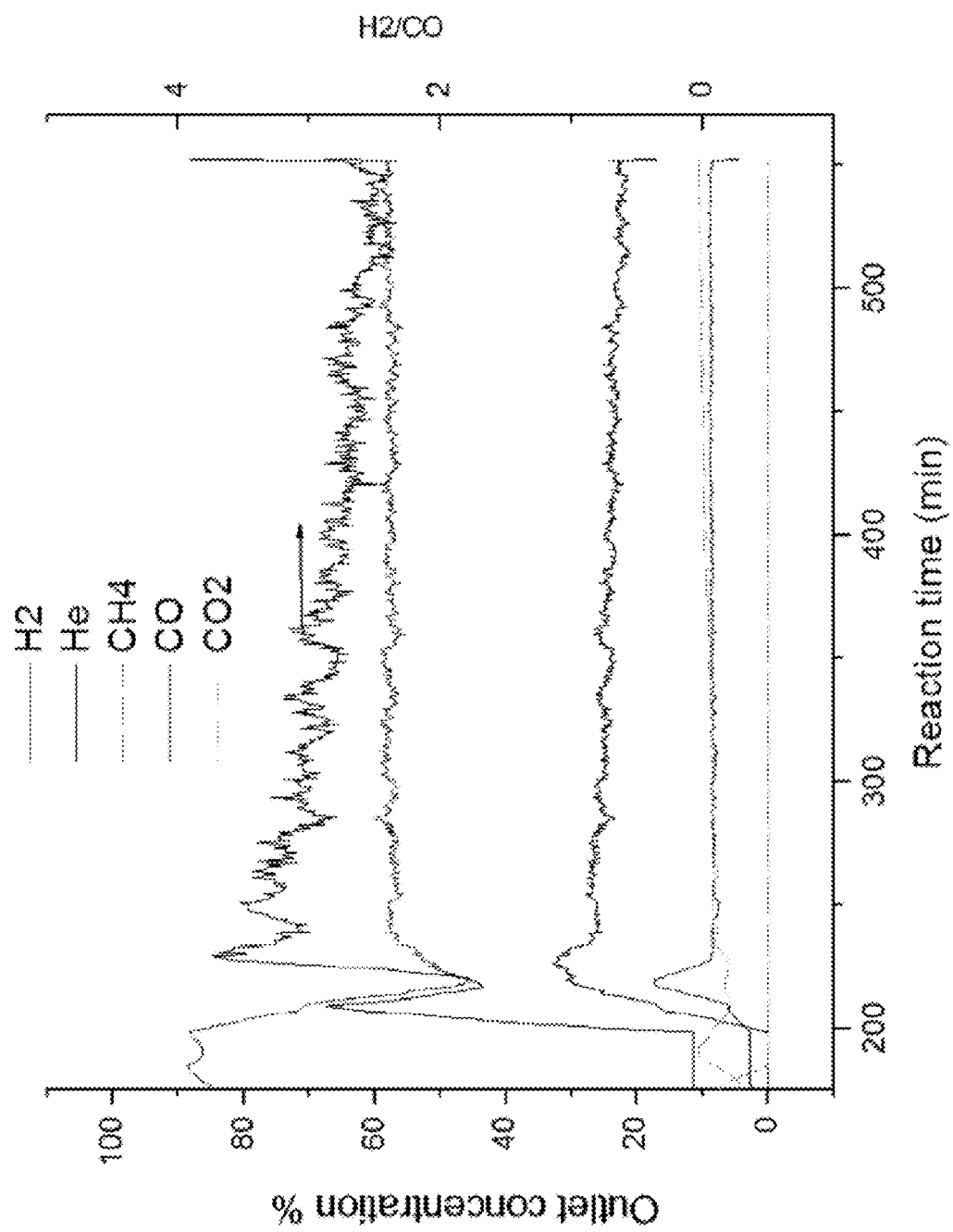
FIG. 13 illustrates a graph depicting bench-scale flow reactor test data for process 2 during methane steam reforming cycle 3 with reduced $CuO$—$Fe_2O_3$-alumina oxygen carrier at 800° C. with 10% methane/30% steam (reduction time ~15 min reforming for ~400 min]

The synthesis gas compositions at a lower methane to stream ratio (10% methane and 30% steam) for this reaction sequence at 800° C. are shown in FIG. 13. After reducing the oxygen carrier for 15 minutes, methane steam was performed for 400 min. The $H_2$/CO ratio with 10% methane was about 2.5-3, which was lower than that with 20% methane. When the steam preforming time was 400 mins, the reduced oxygen carrier was fully oxidized with steam, and it was not necessary to oxidize with air. When the steam/methane content was high, the concentration of hydrogen produced was higher. The desired synthesis gas composition can be achieved by varying the concentration ratio of steam to methane.

Figure 14:
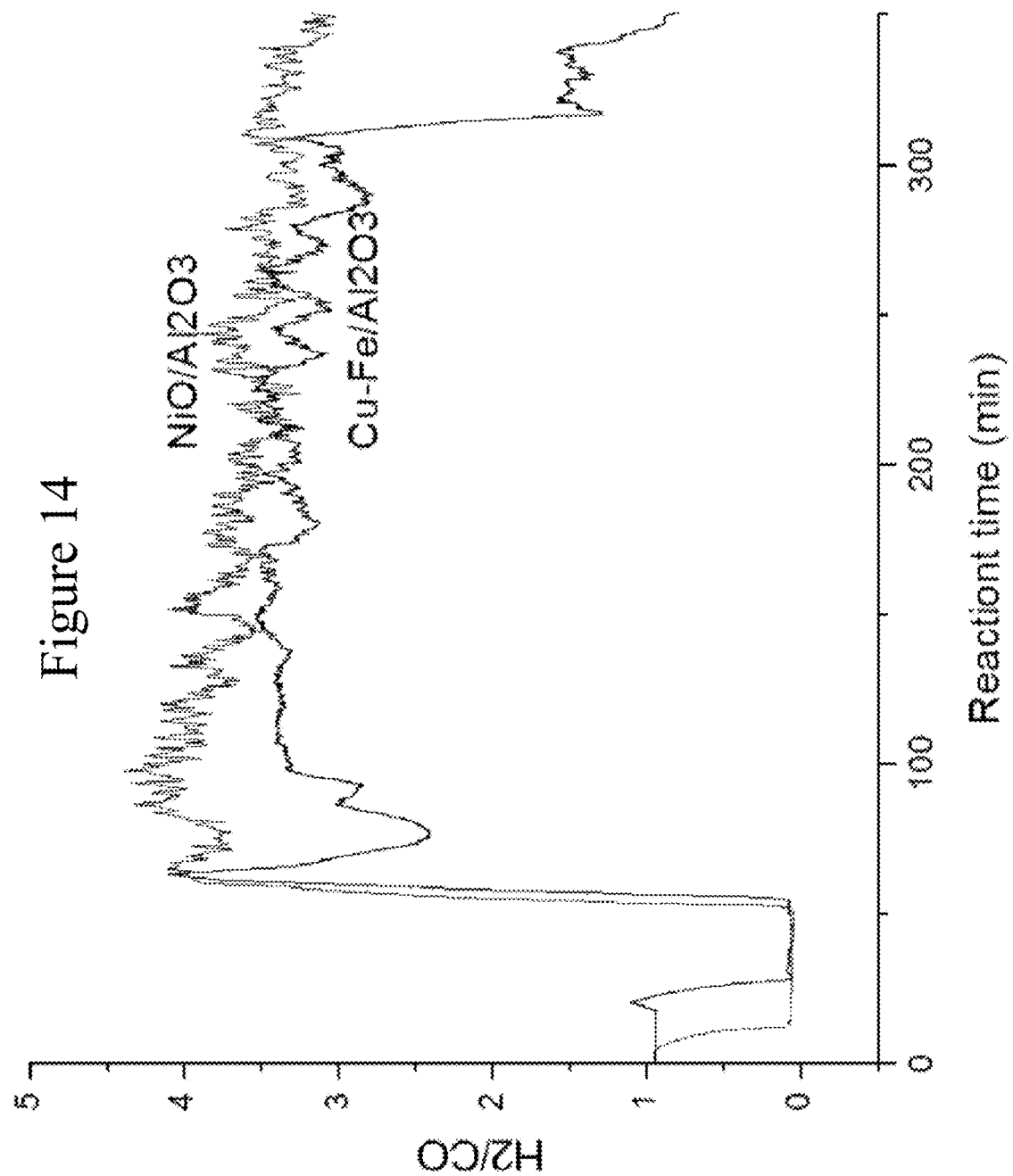
FIG. 14 illustrates a graph depicting comparison of syngas (cycle 3) with reduced $CuO$—$Fe_2O_3$-alumina and commercial $NiO/Al_2O_3$ catalyst at 800° C. with 20% methane/30% steam.

For comparison, 12% $NiO/Al_2O_3$, a commercial steam reforming catalyst, and reduced $CuO$—$Fe_2O_3/Al_2O_3$ were tested for the reaction sequence under identical conditions (800° C., 20% methane, 30%/o steam) and the results are shown in FIG. 14. During the steam reforming step, $H_2$/CO ratios for the $CuO$—$Fe_2O_3/Al_2O_3$ oxygen carrier and the nickel catalyst were similar but the 12% Ni/alumina commercial catalyst had unconverted methane while $CuO$—$Fe_2O_3/Al_2O_3$ had fully converted methane.

Energy Analysis of the Production Process of Synthesis Gas from Methane Steam Reforming Coupled with CLC Using $CuO$—$Fe_2O_3$ Oxygen Carrier The reduced oxygen carrier acts as a steam reforming catalyst to produce synthesis gas according to reaction 5, which is endothermic. In addition to acting as a catalyst, the fully reduced oxygen carrier is also oxidized by steam during the steam reforming process, which could be exothermic or endothermic depending on the Cu to Fe ratio in the oxygen carrier as shown in FIG. 11. The CLC reduction reaction 1 with methane can also be either endothermic or exothermic depending on the Cu to Fe ratio of the oxygen carrier, also shown in FIG. 11.

Figure 15:
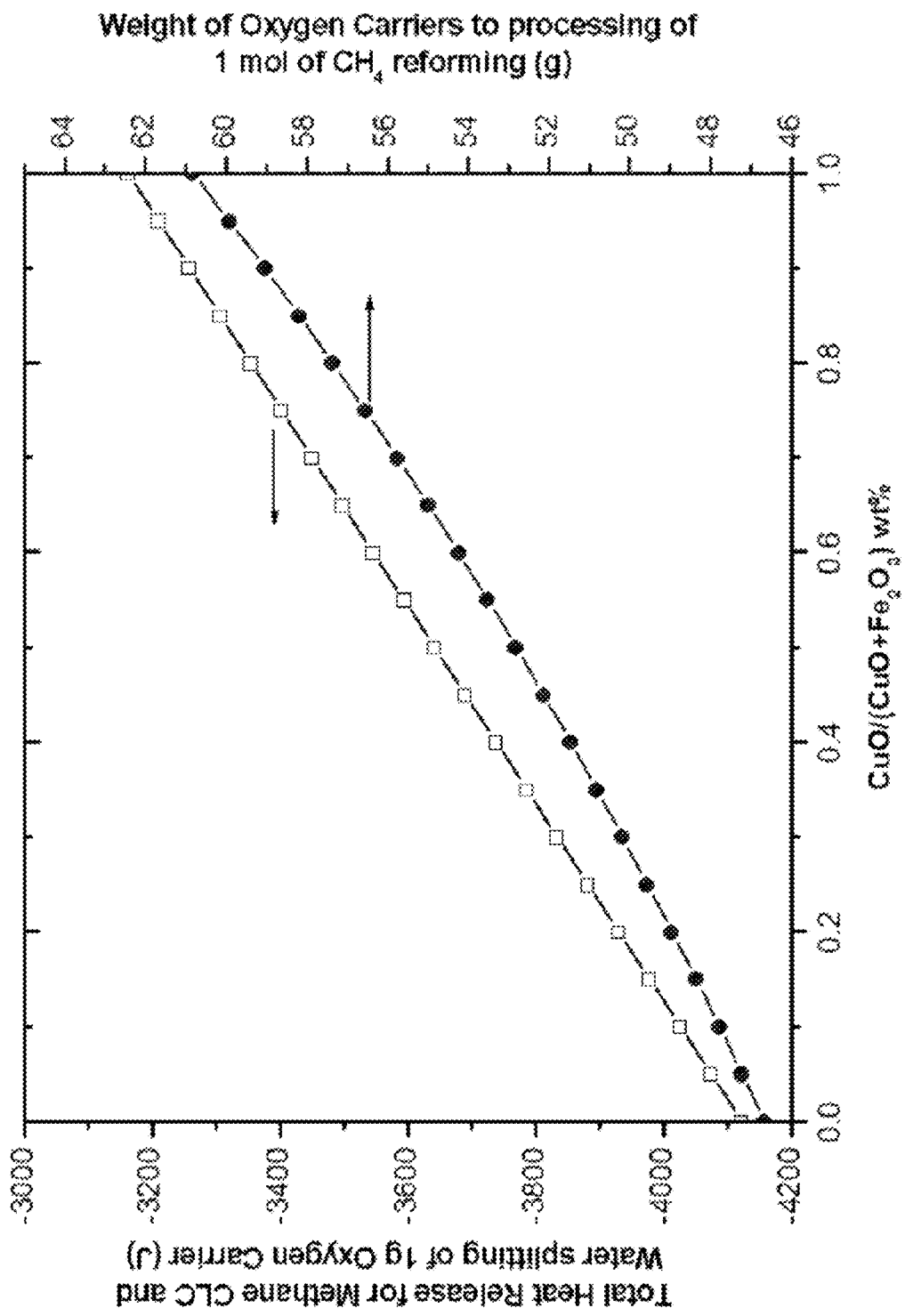
FIG. 15 illustrates a graph depicting combined heats for CLC reduction reaction 1, air oxidation by steam reaction 5 computed for different compositions of the Cu/Fe ratios of the oxygen carrier with final reduction states $Cu^0$ and $Fe^0$.
Figure 16:
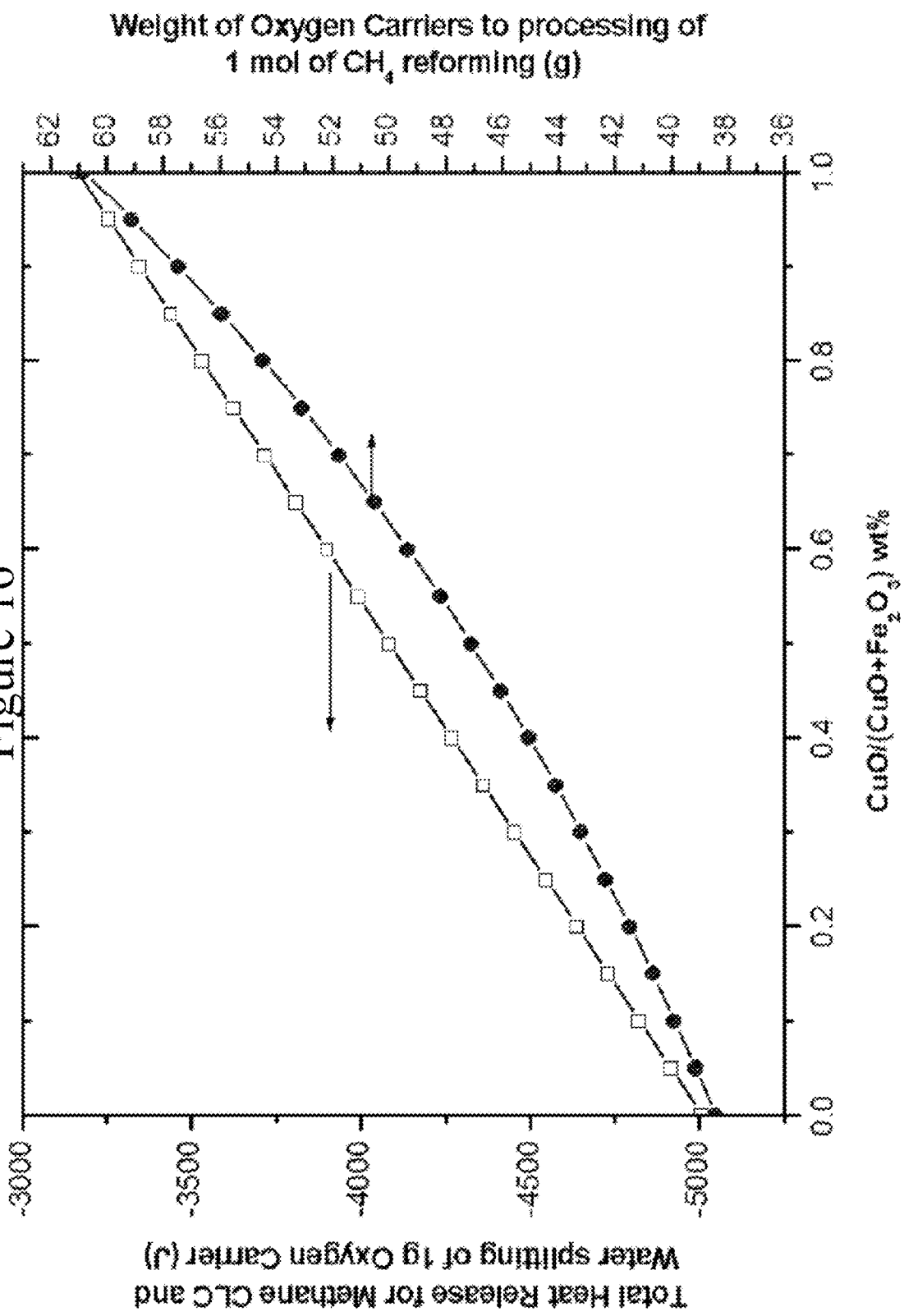
FIG. 16 illustrates a graph depicting combined heats for the CLC reduction reaction 1, air oxidation reaction 3 and oxidation by steam reaction 5 computed for different compositions of the Cu/Fe in the oxygen carrier with final reduction states $Cu^0$ and $Fe^0$.

The oxidation reaction 3 with air is exothermic with the oxygen carrier. Combined heats for reactions 1, 3, and 5 computed for different compositions of the Cu/Fe in the oxygen carrier, are shown in FIG. 15 using final reduction states of CuO and $Fe_2O_3$ as $Cu^0$ and $Fe^0$, and the combined heats using final reduction states of CuO and $Fe_2O_3$ as $Cu^0$ and $Fe^0$ are shown in FIG. 16. Amounts of solid material necessary to process I mole of methane for the steam reforming process are also shown in FIGS. 15 and 16. If $Fe_2O_3$ is reduced to $Fe^0$, results indicate that when copper content increases, the amount of oxygen carrier necessary for the process also increases. However, the amount of oxygen carrier necessary for the process decreases with increasing copper content when $Fe_2O$ reduction is limited to $Fe^0$, as shown in FIG. 16.

In order to produce the same quantity of hydrogen (1M scf/day) that is produced from a commercial SMR process in the chemical and oil industry, the solid circulating rate of the process described in this paper need only be 266 pounds of solid per hour or only 31.4 g of oxygen carrier of per liter of feedstock, which is significantly less than 5 kg per kg of feedstock used in the commercial fluidized catalytic cracking process. Therefore, designing a commercial-scale reactor system with solid processing for the current proposed process will not be difficult.

CONCLUSIONS

Two processes to form pure hydrogen and synthesis gas from methane coupled with CLC were evaluated using a $CuO$—$Fe_2O_3/Al_2O_3$ oxygen carrier. $CuO$—$Fe_2O_3$ was very effective as an oxygen carrier for the reduction of methane and oxidation with air. In the first process, the reduced oxygen carrier served as a catalyst for methane decomposition to produce pure hydrogen and carbon. Carbon deposited on the oxygen carrier was gasified with steam to produce synthesis gas. After carbon was removed, it was re-used as a catalyst for methane decomposition. Heat for the endothermic methane decomposition and steam carbon gasification was provided by the methane CLC reaction of the $CuO$—$Fe_2O_3$ oxygen carrier. The process steps were evaluated in a bench-scale reactor and performed consistently during cyclic tests. Performance was better at 800° C. than 700° C. In the second process, the reduced $CuO$—$Fe_2O_3/Al_2O_3$ oxygen.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method for producing synthesis gas or carbon and hydrogen utilizing a reduced $CuO$—$Fe_2O_3$ oxygen carrier, the method comprising:
   introducing $CH_4$ to the $CuO$—$Fe2O3$ oxygen carrier;
   reducing the $CuO$—$Fe_2O_3$ oxygen carrier with the introduced $CH_4$, yielding at least a reduced oxygen carrier;
   introducing methane to a first portion of the reduced oxygen carrier, producing carbon and hydrogen by methane decomposition, wherein the reduced oxygen carrier acts as a catalyst for methane decomposition;
   introducing steam to the first portion for the gasification of the carbon, thereby producing syngas; and
   oxidizing a second portion of the reduced oxygen carrier with $O_2$ yielding $CuO$—$Fe_2O_3$; and
   generating heat from the oxidation reaction, wherein the heat is applied to the gasification reaction and the methane decomposition reaction.

2. The method of claim 1, further comprising reducing the $CuO$—$Fe_2O_3$ with the introduced $CH_4$, yielding $CO_2$ and $H_2O$ in addition to the reduced oxygen carrier, wherein the $CO_2$ is sequestration ready.

3. The method of claim 2, further comprising decomposing the $CH_4$, yielding C and $2H_2$.

4. The method of claim 3, further comprising gasifying the yielded C with steam, yielding CO and $H_2$.

5. The method of claim 1, further comprising steam reforming the $CH_4$ using the reduced oxygen carrier as a steam reforming catalyst.

6. The method in claim 1, further comprising producing a concentrated $CO_2$ stream that is sequestration ready from the reduction of the oxygen carrier.

7. A method for producing synthesis gas or carbon and hydrogen, the method comprising:
   reducing a $CuO$—$Fe_2O_3$ oxygen carrier, yielding at least a reduced oxygen carrier and $CO_2$, wherein the $CO_2$ is sequestration ready;
   introducing methane;
   producing carbon and hydrogen with the reduced oxygen carrier, wherein the reduced oxygen carrier acts as a catalyst for methane decomposition;
   introducing steam to generate syngas by carbon gasification; and
   generating heat by oxidation of the reduced oxygen carrier, wherein the heat is applied to the methane decomposition reaction and the gasification reaction.

8. The method of claim 7, further comprising reducing the $CuO$—$Fe_2O_3$ with $CH_4$, yielding $CO_2$ and $H_2O$ in addition to the reduced oxygen carrier.

9. The method of claim 8, further comprising decomposing the $CH_4$, yielding C and $2H_2$.

10. The method of claim 9, further comprising gasifying the yielded C with steam, yielding CO and $H_2$.

11. The method of claim 7, further comprising reforming an introduced $CH_4$ using the reduced oxygen carrier and steam, wherein the reduced oxygen carrier acts as a steam reforming catalyst.

* * * * *